(12) United States Patent
Chaudhary et al.

(10) Patent No.: US 8,600,998 B1
(45) Date of Patent: Dec. 3, 2013

(54) METHOD AND SYSTEM FOR MANAGING METADATA IN A CLUSTER BASED STORAGE ENVIRONMENT

(75) Inventors: Anant Chaudhary, Fremont, CA (US); Gaurav Agarwal, Menlo Park, CA (US); Sloan Johnson, San Francisco, CA (US); Manish M. Agarwal, Santa Clara, CA (US); Varun Jobanputra, San Jose, CA (US); Vikram Shukla, Fremont, CA (US); Sridher Jeyachandran, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 598 days.

(21) Appl. No.: 12/706,953

(22) Filed: Feb. 17, 2010

(51) Int. Cl.
*G06F 7/00* (2006.01)
*G06F 17/30* (2006.01)

(52) U.S. Cl.
USPC ............................................................. 707/741

(58) Field of Classification Search
USPC ........................................................ 707/741
See application file for complete search history.

(56) References Cited

U.S. PATENT DOCUMENTS 7,801,894 B1 * 9/2010 Bone et al. ................... 707/737
2008/0059989 A1 * 3/2008 O'Connor et al. ............ 725/9

OTHER PUBLICATIONS

Non-Final Office Action on co-pending U.S. Appl. No. 12/706,974 dated Sep. 12, 2012.
Final Office Action on co-pending U.S. Appl. No. 12/706,974 dated Apr. 24, 2013.

* cited by examiner

*Primary Examiner* — Fred I Ehichioya
*Assistant Examiner* — Kris Mackes
(74) *Attorney, Agent, or Firm* — Klein, O'Neill & Singh, LLP

(57) ABSTRACT

Method and system is provided for managing metadata for a plurality of data containers that are stored at one or more storage volumes in a clustered storage system. The metadata is collected from one or more storage volumes and then provided to a catalog module. The catalog module pre-processes the metadata and then generates a searchable data structure. The searchable data structure may then be used to respond to a user request for information regarding the storage system.

31 Claims, 15 Drawing Sheets

DIRECTORY$_{0\ at\ time\ t0}$ 450

| Inode 450A | Parent 450B | Dirpath 450C | Dirname 450D | Size 450E | Mode 450F | Uid 450G | Gid 450H | Atime 450I | Ctime 450J | mtime 450K | Flag 450L |
|---|---|---|---|---|---|---|---|---|---|---|---|
| 10 | 0 | / | a | | | | | | | | |
| 20 | 0 | / | b | | | | | | | | |
| 30 | 10 | /a/ | c | | | | | | | | |
| 40 | 10 | /a/ | d | | | | | | | | |

FILES$_{0\ at\ time\ t1}$ 452

| Inode 452A | Parent 452B | Filename 452C | Size 452D | Mode 452E | Uid 452F | Gid 452G | Atime 452H | Ctime 452I | Mtime 452J | Flag 452K |
|---|---|---|---|---|---|---|---|---|---|---|
| 31 | 30 | f.txt | | | | | | | | |
| 41 | 40 | g.txt | | | | | | | | |
| 42 | 40 | h.doc | | | | | | | | |
| 43 | 40 | i.cpp | | | | | | | | |
| 44 | 40 | j.pdf | | | | | | | | |
| 51 | 20 | e.jpeg | | | | | | | | |

DIRECTORY$_{1\ at\ time\ t1}$ 450'

| Inode 450A | Parent 450B | Dirpath 450C | Dirname 450D | Size 450E | Mode 450F | Uid 450G | Gid 450H | Atime 450I | Ctime 450J | Mtime 450K | Flag 450L |
|---|---|---|---|---|---|---|---|---|---|---|---|
| 30 | 10 | /a | c | | | | | | | | 'D' |
| 30 | 20 | /b | c | | | | | | | | 'A' |
| 50 | 20 | /b | z | | | | | | | | 'A' |
| 40 | 10 | /a/ | d | | | | | | | | 'M' |

FILES$_{1\ at\ time\ t1}$ 452'

| inode 452A | Parent 452B | Filename 452C | Size 452D | Mode 452E | Uid 452F | Gid 452G | Atime 452H | Ctime 452I | Mtime 452J | Flag 452K |
|---|---|---|---|---|---|---|---|---|---|---|
| 31 | 30 | f.txt | | | | | | | | 'D' |
| 31 | 30 | f.txt | | | | | | | | 'A' |
| 45 | 50 | y.doc | | | | | | | | 'A' |
| 44 | 40 | j.pdf | | | | | | | | 'M' |
| 42 | 40 | h.doc | | | | | | | | 'D' |

| ID 440A | NAME 440B | CREATION_TIME 440C | INDEX_START_TIME 440D | INDEX_END_TIME 440E | ATTR 440F |
|---|---|---|---|---|---|
| 0 | | | | | |
| 1 | | | | | |
| ... | | | | | |
| 255 | | | | | |

SNAPSHOT TABLE 440

FIG. 4C

DATA STRUCTURE (DIRECTORY) 450

| Identifier 450A | Parent 450B | Dir path 450C | Directory Name 450D | Size 450E | Mode 450F | Owner ID (uid) 450G | Group ID (Gid) 450H | Atime 450I | Ctime 450J | Mtime 450K | Flag 450L | Snap ID 450M |
|---|---|---|---|---|---|---|---|---|---|---|---|---|
| 10 | 0 | / | a | | | | | | | | | |
| 20 | 0 | / | b | | | | | | | | | |
| 30 | 10 | /a/ | c | | | | | | | | | |
| 40 | 10 | /a/ | d | | | | | | | | | |

FIG. 4D

DATA STRUCTURE (Files) 452

| Identifier 452A | Parent 452B | File Name 452C | Size 452D | Mode 452E | Owner ID (uid) 452F | Group ID (Gid) 452G | Atime 452H | Ctime 452I | Mtime 452J | Flag 452K | Snap ID 452L |
|---|---|---|---|---|---|---|---|---|---|---|---|
| 31 | 30 | f.txt | | | | | | | | | |
| 41 | 40 | g.txt | | | | | | | | | | |
| 42 | 40 | h.doc | | | | | | | | | | |
| 43 | 40 | i.cpp | | | | | | | | | | |
| 44 | 40 | j.pdf | | | | | | | | | | |
| 51 | 20 | e.jpeg | | | | | | | | | | |

FIG. 4E

DIRECTORY₀ at time t0 450

| Inode 450A | Parent 450B | Dirpath 450C | Dirname 450D | Size 450E | Mode 450F | Uid 450G | Gid 450H | Atime 450I | Ctime 450J | mtime 450K | Flag 450L |
|---|---|---|---|---|---|---|---|---|---|---|---|
| 10 | 0 | / | a | | | | | | | | |
| 20 | 0 | / | b | | | | | | | | |
| 30 | 10 | /a/ | c | | | | | | | | |
| 40 | 10 | /a/ | d | | | | | | | | |

FILES₀ at time t1 452

| Inode 452A | Parent 452B | Filename 452C | Size 452D | Mode 452E | Uid 452F | Gid 452G | Atime 452H | Ctime 452I | Mtime 452J | Flag 452K |
|---|---|---|---|---|---|---|---|---|---|---|
| 31 | 30 | f.txt | | | | | | | | |
| 41 | 40 | g.txt | | | | | | | | |
| 42 | 40 | h.doc | | | | | | | | |
| 43 | 40 | i.cpp | | | | | | | | |
| 44 | 40 | j.pdf | | | | | | | | |
| 51 | 20 | e.jpeg | | | | | | | | |

DIRECTORY₁ at time t1 450'

| Inode 450A | Parent 450B | Dirpath 450C | Dirname 450D | Size 450E | Mode 450F | Uid 450G | Gid 450H | Atime 450I | Ctime 450J | Mtime 450K | Flag 450L |
|---|---|---|---|---|---|---|---|---|---|---|---|
| 30 | 10 | /a | c | | | | | | | | 'D' |
| 30 | 20 | /b | c | | | | | | | | 'A' |
| 50 | 20 | /b | z | | | | | | | | 'A' |
| 40 | 10 | /a/ | d | | | | | | | | 'M' |

FILES₁ at time t1 452'

| inode 452A | Parent 452B | Filename 452C | Size 452D | Mode 452E | Uid 452F | Gid 452G | Atime 452H | Ctime 452I | Mtime 452J | Flag 452K |
|---|---|---|---|---|---|---|---|---|---|---|
| 31 | 30 | f.txt | | | | | | | | 'D' |
| 31 | 30 | f.txt | | | | | | | | 'A' |
| 45 | 50 | y.doc | | | | | | | | 'A' |
| 44 | 40 | j.pdf | | | | | | | | 'M' |
| 42 | 40 | h.doc | | | | | | | | 'D' |

FIG. 4F

METHOD AND SYSTEM FOR MANAGING METADATA IN A CLUSTER BASED STORAGE ENVIRONMENT

CROSS-REFERENCE TO RELATED APPLICATION

This patent application is related to US Patent Application, entitled "METHOD AND SYSTEM FOR MANAGING METADATA IN A STORAGE ENVIRONMENT", Ser. No. 12/706,974, filed on even date herewith and the disclosure of which is incorporated herein by reference in its entirety.

TECHNICAL FIELD

The present disclosure relates to storage systems.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client processing systems ("clients"). The storage operating system stores and manages shared data containers in a set of mass storage devices, such as magnetic or optical disks or tapes.

In traditional storage environments, the operating system is typically geared towards handling access to one object at a time. Access to a group of data containers within a file system is difficult because the operating system layout is such that metadata for data containers, for example, a file name, attributes, access control lists, and information regarding an owner of the data container may not be stored contiguously at a storage device and may be stored at different locations. Therefore, it is difficult for an operating system to respond to user queries for information regarding a data container or a group of data containers because one typically has to traverse through a namespace and perform an extensive directory search. The term namespace refers to a virtual hierarchical collection of unique volume names or identifiers and directory paths to the volumes, in which each volume represents a virtualized container storing a portion of the namespace descending from a single root directory. This is inefficient because metadata information is stored at various locations and also a directory may have a large number of files within a namespace. Continuous efforts are being made to integrate managing data containers and the metadata for the data containers.

SUMMARY

In one embodiment, a method and system for managing metadata for a plurality of data containers that are stored at one or more storage volumes in a cluster based storage environment is provided. The metadata is collected from one or more storage volumes and then provided to a catalog module. The catalog module pre-processes the metadata and then generates a searchable data structure. The searchable data structure may then be used to respond to a user request for information regarding any data container stored at any location within the cluster based storage environment.

In another embodiment, a system having a plurality of nodes operationally coupled to each other in a clustered environment is provided. Each node manages at least a storage volume from among a plurality of storage volumes used for storing a plurality of data containers. A metadata collection module collects metadata associated with the plurality of data containers. The metadata includes an attribute that is associated with the plurality of data containers. The system further includes a catalog module that is executed by the plurality of nodes and pre-processes the collected metadata by extracting one or more fields. The catalog module stores the pre-processed metadata in a searchable data structure for responding to a user query requesting information regarding any data container stored at any storage volume and managed by any node in the clustered environment.

In yet another embodiment, a system is provided. The system includes a catalog module that is executed by a plurality of nodes operationally coupled to each other in a cluster based environment. Each node manages at least a storage volume from among a plurality of data storage volumes used for storing a plurality of data containers. The catalog module is configured to pre-process collected metadata by extracting one or more fields and generates a searchable data structure based on the pre-processed metadata for obtaining information regarding any data container stored at any storage data volume and managed by any node.

In another embodiment, a system is provided. The system includes a computing system for generating a request for information regarding a plurality of data containers stored at a plurality of storage volumes. The system also includes a plurality of nodes interfacing with each other and the computing system and managing the plurality of storage volumes.

The system further includes a catalog module that is executed by the plurality of nodes, the catalog module configured to pre-process collected metadata by extracting one or more fields and generating a searchable data structure using the pre-processed metadata for responding to the request for information regarding any data container stored at any storage data volume and managed by any of the plurality of nodes.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIGS. 4C-4F show examples of different data structures used by the catalog system, according to one embodiment;

DETAILED DESCRIPTION

Definitions

Figure 1A:
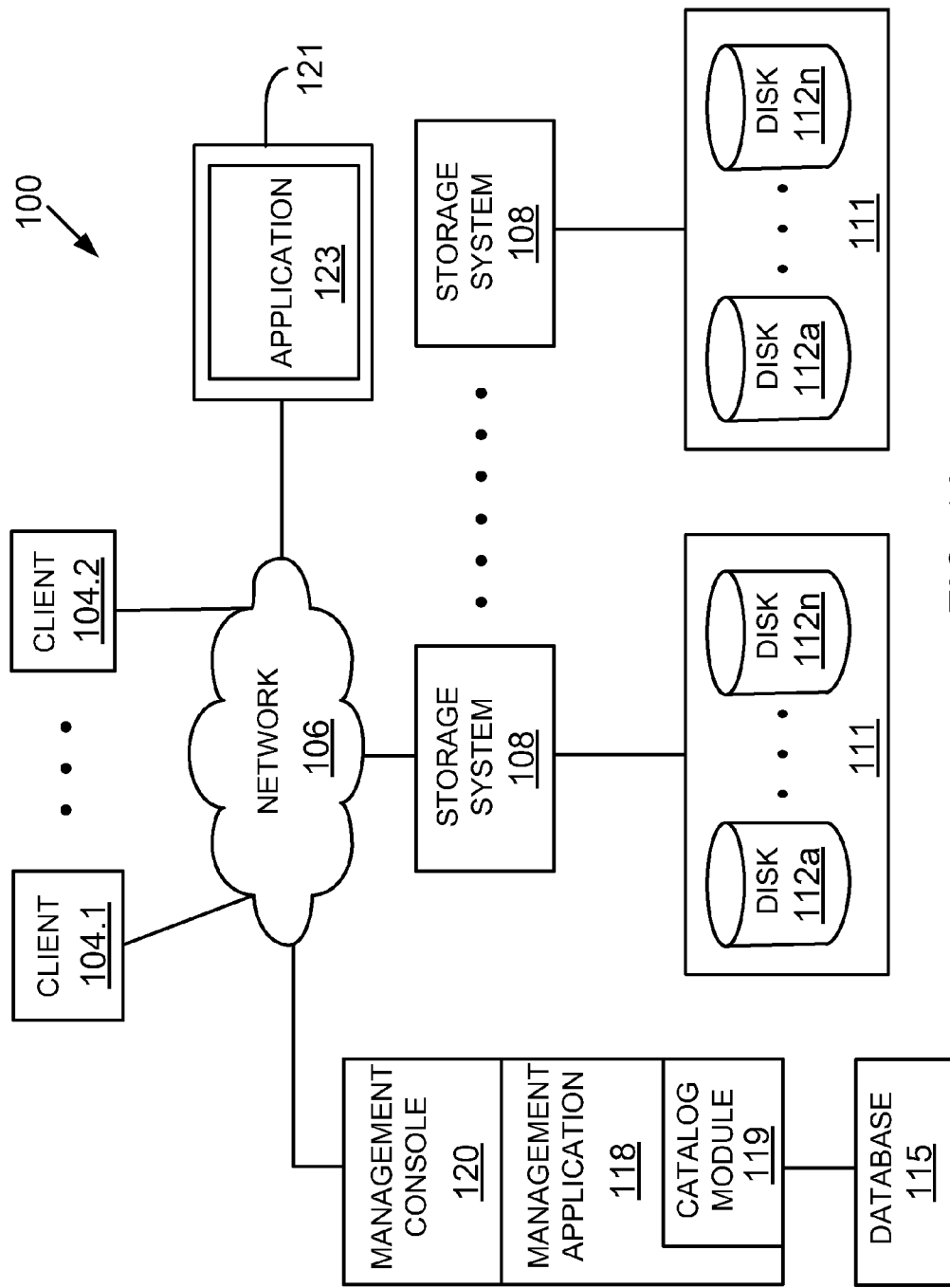
FIG. 1A shows a block diagram of a storage environment, managed according to one embodiment.

The following definitions are provided as they are typically (but not exclusively) used in the computing/storage environment, implementing the various adaptive embodiments described herein.

"Aggregate" is a logical aggregation of physical storage, i.e., a logical container for a pool of storage, combining one or more physical mass storage devices (e.g., disks) or parts thereof into a single logical storage object, which includes or provides storage for one or more other logical data sets at a higher level of abstraction (e.g., volumes).

"CIFS" means the Common Internet File System Protocol, an access protocol that client systems use to request file access services from storage systems over a network.

"Data Container" means a block, a file, a logical unit of data or any other information.

"FC" means Fibre Channel, a high-speed network technology primarily used for storage networking. Fibre Channel Protocol (FCP) is a transport protocol (similar to Transmission Control Protocol (TCP) used in Internet Protocol ("IP") networks) which predominantly transports SCSI commands over Fibre Channel networks.

"iSCSI" means the Internet Small Computer System Interface, an IP based storage networking standard for linking data storage facilities. The standard allows carrying SCSI commands over IP networks. iSCSI may be used to transmit data over local area networks (LANs), wide area networks (WANs), or the Internet and can enable location-independent data storage and retrieval.

"Metadata" refers to one or more attributes for a data container, for example, a directory or data file. The attributes include (a) a unique data container identifier, for example, an inode number; (b) a data container type, i.e., if the data container is a directory, file and others; (c) information regarding whether the data container was created, modified or deleted; (d) a data container name (for example, NFS file name and CIFS file name) and path; (e) an owner identifier, for example, an NFS user identifier or a CIFS owner identifier; (f) a group identifier, for example, an NFS group identifier (GID); (g) a data container size; (h) permissions associated with the data container, for example, NFS permission bits that provide information regarding permissions associated with the data container; (i) time the data container was accessed (access time); (j) time the data container was modified (modification time); (k) time the data container was created (creation time), when applicable; and (l) any other custom fields that may be specified by a user or a storage system, for example, access control lists (ACLS) or a named stream which is a CIFS level feature that connects a file to a directory or any other attribute.

"Namespace" refers to a virtual hierarchical collection of unique volume names or identifiers and directory paths to the volumes, in which each volume represents a virtualized container storing a portion of the namespace descending from a single root directory. For example, each volume associated with a namespace can be configured to store one or more data files, scripts, word processing documents, executable programs and others. In a typical storage system, the names or identifiers of the volumes stored on a storage server can be linked into a namespace for that storage server. The term global namespace refers to a virtual hierarchical collection of unique volume names or identifiers and directory paths to the volumes, in which the volumes are stored on multiple server nodes within a clustered storage server system. The term virtual in this context means a logical representation of an entity.

"NFS" means Network File System, a protocol that allows a user to access storage over a network.

"Snapshot" (without derogation to any trademark rights of NetApp, Inc.) means a point in time copy of a storage file system. A snapshot is a persistent point in time image of an active file system that enables quick recovery of data after data has been corrupted, lost, or altered. Snapshots can be created by copying the data at each predetermined point in time to form a consistent image, or virtually by using a pointer to form the image of the data.

"Volume" is a logical data set which is an abstraction of physical storage, combining one or more physical mass storage devices (e.g., disks) or parts thereof into a single logical storage object, and which is managed as a single administrative unit, such as a single file system. A volume is typically defined from a larger group of available storage, such as an aggregate.

As used in this disclosure, the terms "component", "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Storage Environment 100:

FIG. 1A shows an example of a non-cluster based storage environment 100 where the various embodiments disclosed herein may be implemented. Storage environment 100 is used to store a plurality of data containers across a plurality of storage devices. The embodiments disclosed herein provide a catalog system that collects metadata for the plurality of data containers, pre-processes the collected metadata and stores the pre-processed information in one or more searchable data structures, for example, a relational database. The searchable data structure may then be used to search for information regarding the plurality of data containers and respond to user queries with respect to the stored data containers.

Storage environment 100 may include a plurality of storage systems 108, each coupled to a storage subsystem 111. A storage subsystem 111 may include multiple mass storage devices 112a-112n (may also be referred to as 112) that may be used to store a plurality of data containers (for example, directory files and data files) as well as the searchable data structure, as described below. The mass storage devices in each storage subsystem 111 may be, for example, conventional magnetic disks, optical disks such as CD-ROM or DVD based storage, magneto-optical (MO) storage, flash memory storage device or any other type of non-volatile storage devices suitable for storing data.

Each storage subsystem 111 is managed by a corresponding storage system 108. The storage devices in each storage subsystem 111 can be organized into one or more redundant array of inexpensive disks ("RAID") groups, in which case the corresponding storage system 108 accesses the storage subsystem 111 using an appropriate RAID protocol.

Each storage system 108 may operate as a NAS based file server, a block-based storage server such as used in a storage area network (SAN), or a combination thereof, or a node in a clustered environment described below with respect to FIG. 2, or any other type of storage server. Note that certain storage systems from NetApp Inc. in Sunnyvale, Calif., are capable of providing clients with both file-level data access and block-level data access.

Storage environment 100 may also include a plurality of client systems 104.1-104.2 (may also be referred to as 104), a management console 120 executing a catalog module 119 and at least one network 106 communicably connecting the client systems 104.1-104.2, storage system 108 and management console 120. The client systems 104.1-104.2 may be connected to the storage systems 108 via the computer network 106, such as a packet-switched network.

Clients 104.1-104.2 may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Processors executing instructions in storage system 108 and client systems 104.1-104.2 communicate according to well-known protocols, such as the NFS protocol or the CIFS protocol, to make data stored on disk 112 appear to users and/or application programs as though the data were stored locally on the client systems 104.1-104.2. The storage system 108 can present or export data stored on disks 112 as a volume, or one or more qtree sub-volume units, to each of the client systems 104.1-104.2. Each volume may be configured to store data files, scripts, word processing documents, executable programs, and the like. As described below in more detail, a volume may be configured to operate as a "catalog volume" that stores a searchable data structure with metadata information regarding directories and data files stored on disks 112.

From the perspective of one of the client systems 104.1-104.2, each volume can appear to be a single disk drive. However, each volume can represent the storage space in one disk, an aggregate of some or all of the storage space in multiple disks, a RAID group, or any other suitable set of storage space.

Specifically, each volume can include a number of individually addressable files. For example, in a NAS configuration, the files of a volume are addressable over the computer network 106 for file-based access. In addition, an aggregate is a fixed-sized volume built on top of a number of RAID groups containing one or more virtual volumes or FlexVol® flexible volumes.

In a typical mode of operation, one of the client systems 104.1-104.2 transmits one or more input/output commands, such as an NFS or CIFS request, over the computer network 106 to the storage system 108. Storage system 108 receives the request, issues one or more I/O commands to storage device 112 to read or write the data on behalf of the client system 104.1-104.2, and issues an NFS or CIFS response containing the requested data over the network 106 to the respective client system.

The management console 120 that executes storage management application (may also be referred to as management application) 118 may be, for example, a conventional PC, workstation, or the like. In another embodiment, management application 118 may also be executed by storage system 108. The management application 118 may be a module with executable instructions, typically used by a storage network administrator to manage a pool of storage devices. Management application 118 enables the administrator to perform various operations, such as monitoring and allocating storage space in the storage pool, creating and deleting volumes, directories and others.

In one embodiment, management application includes a catalog module 119 that interfaces with storage system 108 for receiving metadata, pre-processes the collected metadata and then stores it in a searchable structure, for example, a relational database 115. Although catalog module 119 is shown as a part of management application 118, it may operate as a standalone application or may also be integrated with the operating system of storage system 108. Furthermore, although catalog module 119 is shown in the context of a NAS in FIG. 1A, it can be used effectively in a direct attached storage system (not shown) as well.

Communication between the storage management application 118, clients 104 and storage systems 108 may be accomplished using any of the various conventional communication protocols and/or application programming interfaces (APIs), the details of which are not germane to the technique being introduced here. This communication can be implemented through the network 106 or it can be via a direct link (not shown) between the management console 120 and one or more of the storage systems 108.

One or more other storage-related applications may also be operatively coupled to the network 106, residing and executing in one or more other computer systems 121. Examples of such other applications include data backup software, snapshot management software and others. It is noteworthy that these applications may also be running at storage system 108.

Figure 1B:
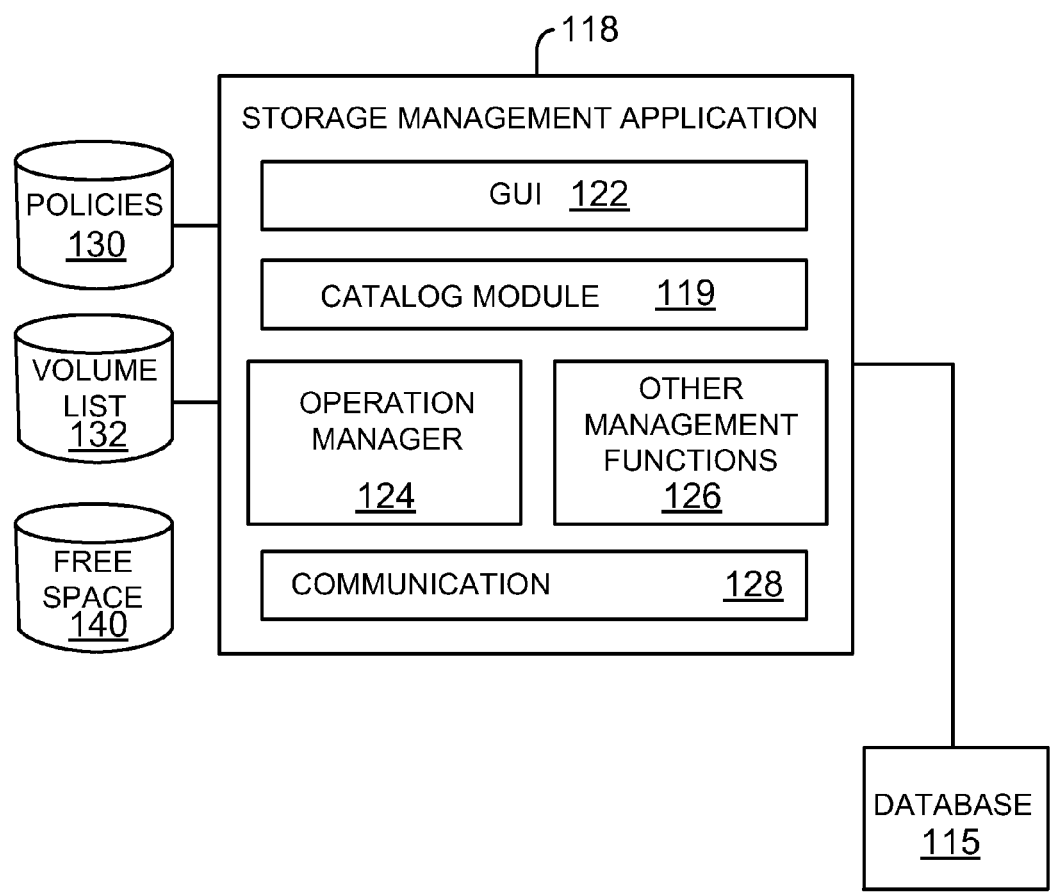
FIG. 1B shows an example of a management application used for managing the storage environment of FIG. 1A, according to one embodiment.

Storage Management Application 118:

FIG. 1B shows a block diagram of storage management application 118 having catalog module 119, according to one embodiment. In the illustrated embodiment, the storage management application 118 may also include a graphical user interface (GUI) module 122 to generate a GUI (e.g., for use by a storage administrator); an Operations Manager 124 for managing storage system 108, according to one embodiment; one or more other management modules 126 to perform various other storage management related functions; and a communication module 128.

The communication module 128 implements one or more conventional communication protocols and/or APIs to enable the storage management application 118 to communicate with the storage system 108 and cluster system 114.

The storage management application 118 may also maintain policies 130, a list 132 of all volumes in a storage pool as well as a table 140 of all free space (on a per-disk basis) in a storage pool. Policies 130 may be used to store configuration information, based on which metadata is collected, pre-processed, indexed and then stored in database 115. Details regarding database 115 are provided below.

Figure 2:
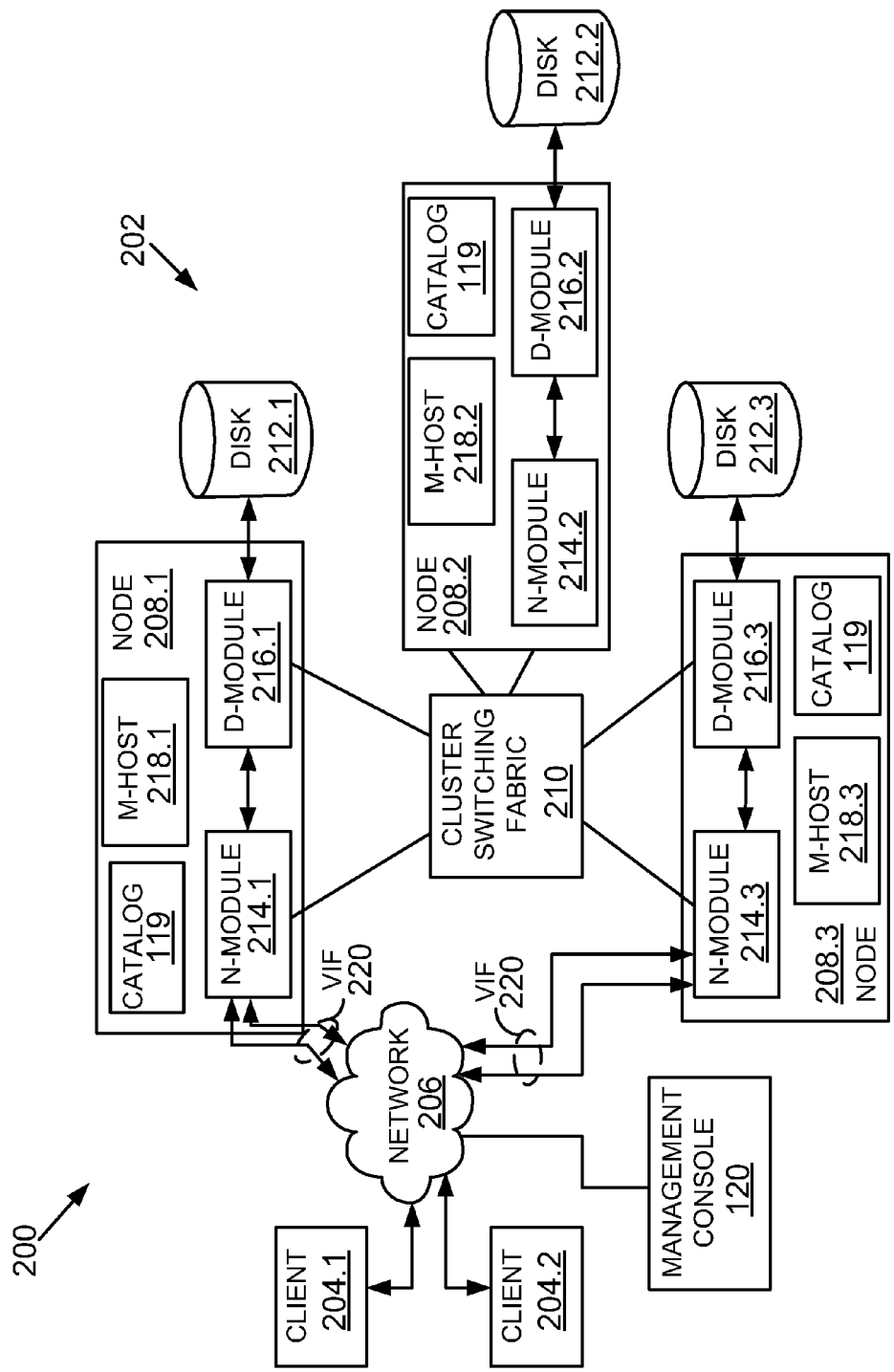
FIG. 2 shows an example of a storage environment with a cluster system, managed according to one embodiment.

Clustered System:

The following describes a cluster based storage system (may also be referred to as "clustered storage system" or "cluster storage system") in a storage environment 200 of FIG. 2. The clustered system is a scalable, distributed architecture that stores data containers at different storage devices that are managed by a plurality of nodes. When configured, metadata for each node is collected and provided to an instance of catalog module 119 executed at each node. The metadata is pre-processed and then stored in a searchable format. More details regarding processing of metadata is provided below.

Storage environment 200 may include a plurality of client systems 204.1-204.2 (may also be referred to as 204), a cluster storage system 202, management console 120 and at least one computer network 206 (similar to network 106) communicably connecting the client systems 204.1-204.2 and a clustered storage system 202.

The clustered storage system 202 includes a plurality of nodes 208.1-208.3 (may also be referred to as 208), a cluster switching fabric 210, and a plurality of mass storage devices such as disks 212.1-212.3 (may also be referred to as disks 212 (similar to storage 112). Each of the plurality of nodes 208.1-208.3 in the clustered storage system 202 provides the functionality of a storage server. Clustered storage systems like the clustered storage system 202 are available from NetApp, Inc.

Each of the plurality of nodes 208.1-208.3 may be configured to include an N-module, a D-module, and an M-host, each of which can be implemented as a separate software module. Specifically, node 208.1 includes an N-module 214.1, a D-module 216.1, and an M-host 218.1; node 208.2 includes an N-module 214.2, a D-module 216.2, and an M-host 218.2; and node 208.3 includes an N-module 214.3, a D-module 216.3, and an M-host 218.3.

The N-modules 214.1-214.3 (may also be referred to as 214) include functionality that enables the respective nodes 208.1-208.3 to connect to one or more of the client systems 204.1-204.2 over the computer network 206, while the D-modules 216.1-216.3 (may also be referred to as 216) connect to one or more of the disks 212.1-212.3. The D-modules interface with a metadata collection module (See FIG. 4B, 416) and provides metadata for a plurality of data containers stored at one or more of disks 212.

The M-hosts 218.1-218.3 (may also be referred to as 218) provide management functions for the clustered storage server system 202. In one embodiment, each M-host 218 includes or interfaces with an instance of catalog module 119 (similar to 410, FIG. 4A) for receiving collected metadata, pre-processing the collected metadata and then storing the information is a searchable data structure.

A switched virtualization layer including a plurality of virtual interfaces (VIFs) (may also be referred to a logical interfaces (LIFs)) 220 is provided between the respective N-modules 214.1-214.3 and the client systems 204.1-204.2, allowing the disks 212.1-212.3 associated with the nodes 208.1-208.3 to be presented to the client systems 204.1-204.2 as a single shared storage pool.

In one embodiment, the clustered storage system 202 can be organized into any suitable number of virtual servers (also referred to as "vservers"), in which each vserver represents a single storage system namespace with separate network access. Each vserver has a user domain and a security domain that are separate from the user and security domains of other vservers. Moreover, each vserver is associated with one or more VIFs and can span one or more physical nodes, each of which can hold one or more VIFs and storage associated with one or more vservers. Client systems can access the data on a vserver from any node of the clustered system, but only through the VIFs associated with that vserver. The interaction between a vserver and catalog module 119 is described below with respect to FIG. 4B.

Each of the nodes 208.1-208.3 is defined as a computer adapted to provide application services to one or more of the client systems 204.1-204.2. In this context, a vserver is an instance of an application service provided to a client system. The nodes 208.1-208.3 are interconnected by the switching fabric 210, which, for example, may be embodied as a Gigabit Ethernet switch. Although FIG. 2 depicts an equal number (i.e., 3) of the N-modules 214.1-214.3, the D-modules 216.1-216.3, and the M-Hosts 218.1-218.3, any other suitable number of N-modules, D-modules, and M-Hosts may be provided. There may also be different numbers of N-modules, D-modules, and/or M-Hosts within the clustered storage server system 202. For example, in alternative embodiments, the clustered storage server system 202 may include a plurality of N-modules and a plurality of D-modules interconnected in a configuration that does not reflect a one-to-one correspondence between the N-modules and D-modules.

The clustered storage server system 202 can include the NETAPP® DATA ONTAP® storage operating system, available from NetApp, Inc., that implements the WAFL® storage system, or any other suitable storage operating system.

The client systems 204.1-204.2 of FIG. 2 may be implemented as general-purpose computers configured to interact with the respective nodes 208.1-208.3 in accordance with a client/server model of information delivery.

Each client system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The client systems 204.1-204.2 may issue packets according to file-based access protocols, such as the NFS protocol or the CIFS protocol, when accessing information in the form of files and directories.

In a typical mode of operation, one of the client systems 204.1-204.2 transmits an NFS or CIFS request for data to one of the nodes 208.1-208.3 within the clustered storage server system 202, and the VIF 220 associated with the respective node receives the client request. It is noted that each VIF 220 within the clustered system 202 is a network endpoint having an associated IP address, and that each VIF can migrate from N-module to N-module. The client request typically includes a file handle for a data file stored in a specified volume on one or more of the disks 212.1-212.3.

Specifically, each volume comprises a storage system subtree that includes an index node file (an inode file) having a root inode, and a set of directories and files contained under the root inode. Each inode is a data structure allocated for a respective data file to store metadata that describes the data file. For example, an inode can contain data and pointers for use in facilitating access to blocks of data within the data file, and each root inode can contain pointers to a number of inodes.

Before describing the details of catalog module 119 and how it interfaces with various components of storage environment 100 and 200, the following provides a description of a storage operating system that may be used in storage environment 100 and 200, according to one embodiment.

Figure 3A:
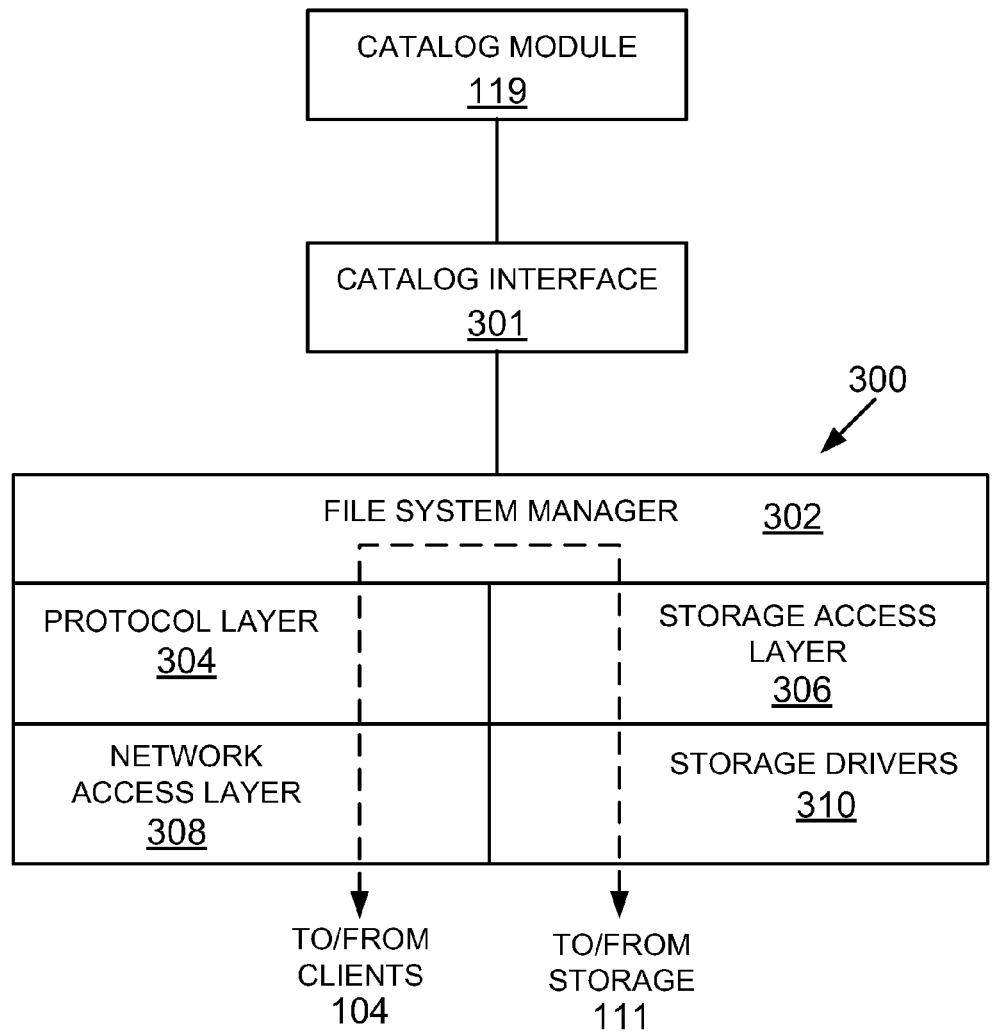
FIGS. 3A and 3B show examples of a storage operating system, used according to one embodiment.

Operating System:

FIG. 3A illustrates a generic example of an operating system 300 executed by a node 208.1 (and/or storage system 108), according to one embodiment of the present disclosure. Operating system 300 interfaces with catalog module 119 via an interface 301. As described below in more detail, operating system 300 provides metadata to catalog module 119 to build a searchable data structure.

In one example, operating system 300 may include several modules, or "layers" executed by one or both of N-Module 214 and D-Module 216. These layers include a file system manager 302 that keeps track of a directory structure (hierarchy) of the data stored in storage devices and manages read/write operations, i.e. executes read/write operations on disks in response to client 204 requests.

Operating system 300 may also include a protocol layer 304 and an associated network access layer 308, to allow node 208.1 to communicate over a network with other systems, such as clients 204 and storage management application 118. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between clients 104 and mass storage devices 112 are illustrated schematically as a path, which illustrates the flow of data through operating system 300.

The operating system 300 may also include a storage access layer 306 and an associated storage driver layer 310 to allow D-module 216 to communicate with a storage device. The storage access layer 306 may implement a higher-level disk storage protocol, such as RAID while the storage driver layer 310 may implement a lower-level storage device access protocol, such as FC or SCSI. In one embodiment, the storage access layer 306 may implement the RAID protocol, such as RAID-4 or RAID-DP™ (RAID double parity for data protection provided by NetApp Inc. the assignee of the present disclosure).

In one embodiment, storage access layer 306 obtains metadata for various data containers that may be stored in a data volume and provides that information to catalog module 119. The information is processed and then stored in a searchable data structure, as described below.

Figure 3B:
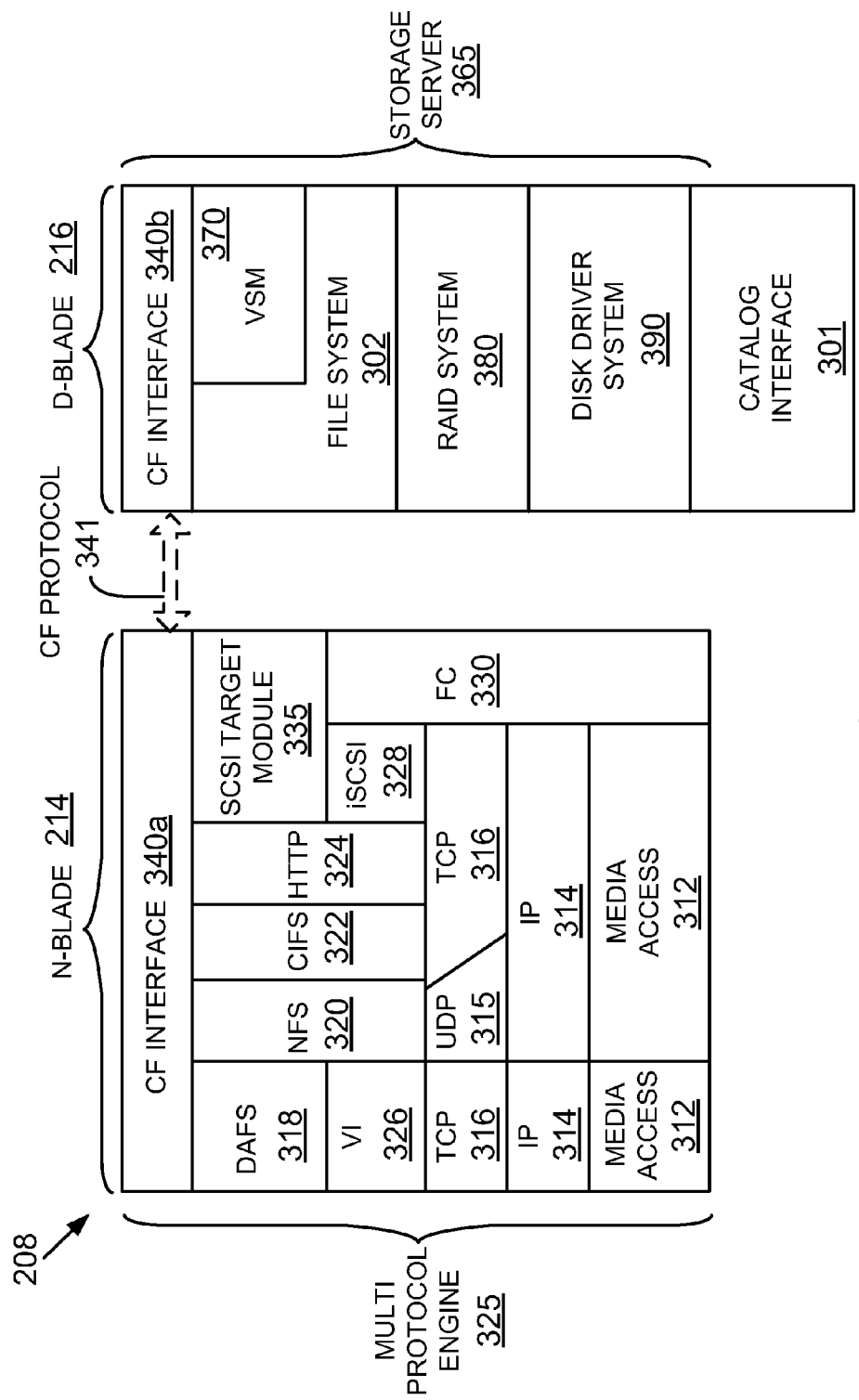

FIG. 3B shows a detailed block diagram of the storage operating system 300 that may be advantageously used with the present invention. In this example, the storage operating system comprises a series of processor executable layers organized to form an integrated network protocol stack or, more generally, a multi-protocol engine 325 that provides data paths for clients to access information stored on the node using block and file access protocols. In addition, the storage operating system includes a series of processor executable layers organized to form a storage server 365 that provides data paths for accessing information stored on the disks 212.1 of the node 208.1. Both the multi-protocol engine 325 and storage server 365 interface with the storage management application 118 such that metadata for data containers stored at disks 212 can be collected, processed and searched, according to one embodiment.

N-blade 214 and D-blade 216 may interface with each other using CF protocol 341. Both blades may also include interface 340a and 340b to communicate with other nodes and systems.

The multi-protocol engine includes a media access layer 312 (part of layer 308, FIG. 3A) of network drivers (e.g., Gigabit Ethernet drivers) that interfaces to network protocol layers (part of layer 304, FIG. 3A), such as the IP layer 314 and its supporting transport mechanisms, the TCP layer 316 and the User Datagram Protocol (UDP) layer 315.

A file system protocol layer provides multi-protocol file access and, to that end, includes support for the Direct Access File System (DAFS) protocol 318, the NFS protocol 320, the CIFS protocol 322 and the HTTP protocol 324.

A virtual interface ("VI") layer 326 implements the VI architecture to provide direct access transport (DAT) capabilities, such as RDMA (Remote Direct Memory Access), as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of LUNS to either iSCSI or FCP or, alternatively, to both iSCSI and FCP when accessing the blocks on the node 208.1.

The storage server 365 includes a file system module 302 in cooperating relation with a volume stripped module (VSM) 370, a RAID system module 380 and a disk driver system module 390.

The VSM 370 illustratively implements a striped volume set (SVS). The VSM 370 cooperates with the file system 302 to enable storage server 365 to service a volume of the SVS.

The RAID system 380 manages the storage and retrieval of information to and from the volumes/disks in accordance with I/O operations, while the disk driver system 390 implements a disk access protocol such as, e.g., the SCSI protocol.

The file system 302 implements a virtualization system of the storage operating system 300 through the interaction with one or more virtualization modules illustratively embodied as, e.g., a virtual disk (vdisk) module (not shown) and a SCSI target module 335. The SCSI target module 335 is generally disposed between the FC and iSCSI drivers 330, 328 and the file system 302 to provide a translation layer of the virtualization system between the block (lun) space and the file system space, where luns are represented as blocks.

The file system 302 is illustratively a message-based system that provides logical volume management capabilities for use in access to the information stored on the storage devices, such as disks.

The file system 302 illustratively may implement a write-anywhere file system having an on-disk format representation that is block-based using, e.g., 4 kilobyte (KB) blocks and using index nodes (inodes) to identify data containers and metadata for the data container (such as creation time, access permissions, size and others). The file system uses data containers to store metadata describing the layout of its file system; these metadata data containers include, among others, an inode data container. A data container handle, i.e., an identifier that includes an inode number (inum), may be used to retrieve an inode from disk.

Typically, the metadata as handled by file system 302 may not be stored contiguously and may be spread out among different storage volumes. This makes it difficult for the file system to provide user requested information that can be derived from the metadata. Hence, as described below in more detail, the present catalog module 119 is being introduced to manage, organize and use the metadata for the data containers.

Broadly stated, all inodes of the write-anywhere file system are organized into the inode data container. A file system (fs) info block specifies the layout of information in the file system and includes an inode of a data container that includes all other inodes of the file system. Each logical volume (file system) has an fsinfo block that is preferably stored at a fixed location within, e.g., a RAID group. The inode of the inode data container may directly reference (point to) data blocks of the inode data container or may reference indirect blocks of the inode data container that, in turn, reference data blocks of the inode data container. Within each data block of the inode data container are embedded inodes, each of which may reference indirect blocks that, in turn, reference data blocks of a data container.

Figure 6:
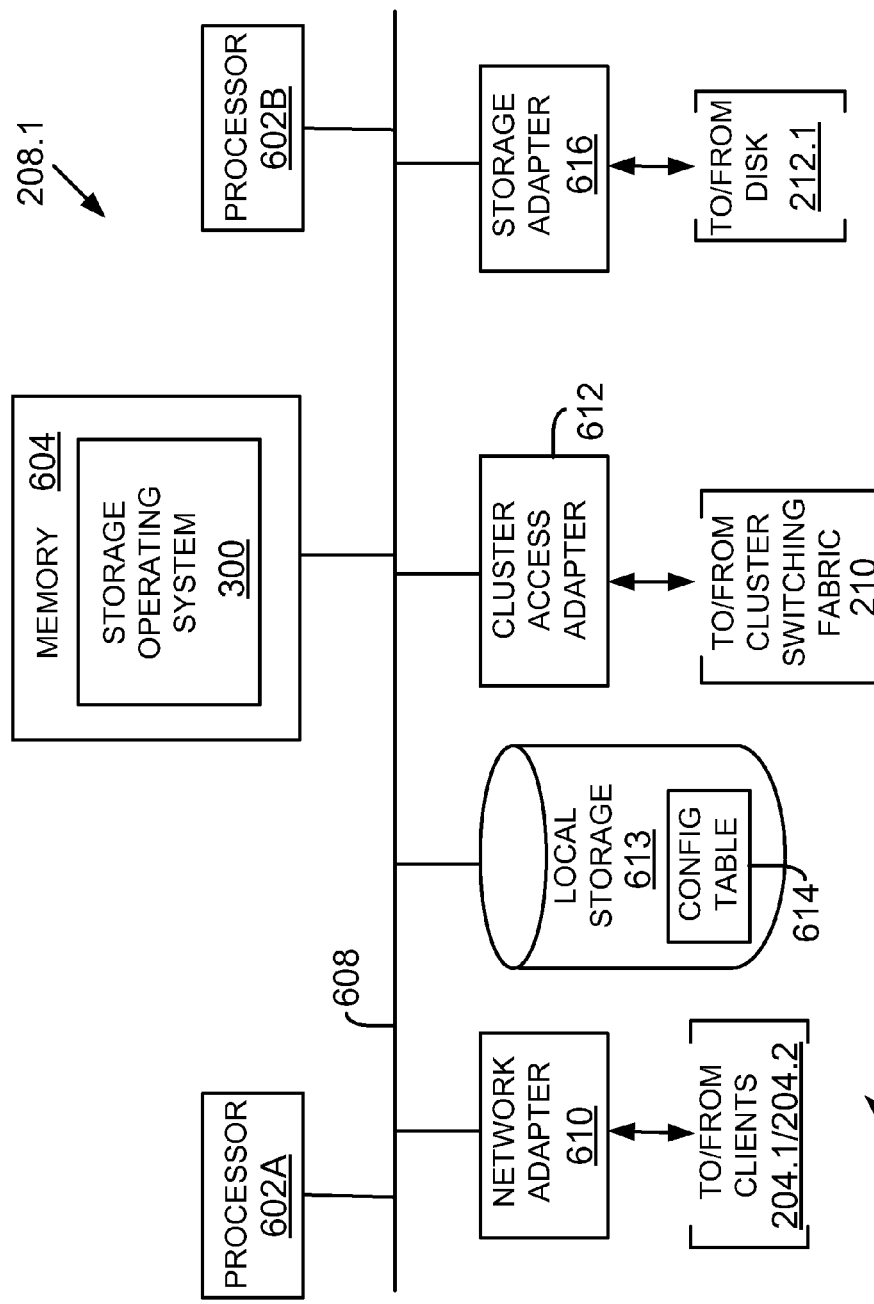
FIG. 6 shows an example of a node used in a cluster system, according to one embodiment.

Operationally, a request from the client 204 is forwarded as a packet over the computer network 206 and onto the node 208.1. A network driver processes the packet and, if appropriate, passes it on to a network protocol and file access layer for additional processing prior to forwarding to the write-anywhere file system 302. Here, the file system generates operations to load (retrieve) the requested data from disk 212 if it is not resident "in core", i.e., in memory 604(FIG. 6).

If the information is not in memory, the file system 302 indexes into the inode data container using the inode number (inum) to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver 390 accesses the dbn from the specified disk 212 and loads the requested data block(s) in memory for processing by the node. Upon completion of the request, the node (and operating system) returns a reply to the client 204.

It should be noted that the software "path" through the operating system layers described above needed to perform data storage access for a client request received at node 208.1 may alternatively be implemented in hardware. That is, in an alternate embodiment of the disclosure, the storage access request data path may be implemented as logic circuitry embodied within a field programmable gate array (FPGA) or an ASIC. This type of hardware implementation increases the performance of the file service provided by node 208.1 in response to a file system request issued by client 204.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 3C:
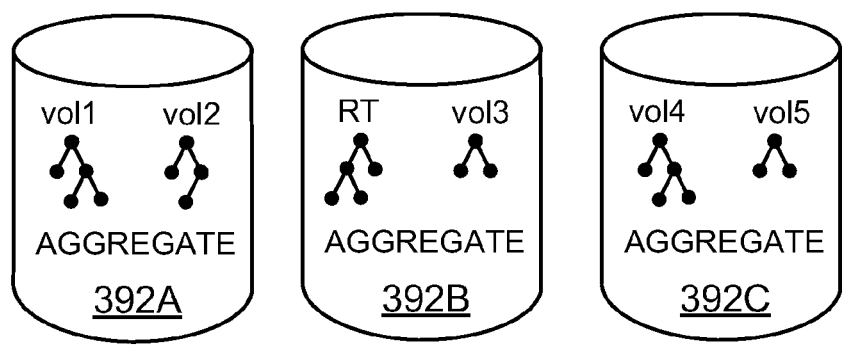
FIG. 3C shows an example of an aggregate, used according to one embodiment.

FIG. 3C depicts three exemplary aggregates 392A, 392B, 392C, which can be stored on one or more of the disks 212.1-212.3 of the clustered storage server system 202 (see FIG. 2). As shown in FIG. 3C, each of the aggregates 392A, 392B, 392C contains two representative volumes, in which each volume comprises a storage system subtree. Specifically, the aggregate 392A contains two volumes vol1, vol2; the aggregate 392B contains two volumes RT, vol3; and the aggregate 392C contains two volumes vol4, vol5. In the clustered storage server system 202, the names of the volumes from the plurality of nodes 208.1-208.3 are linked into a global namespace, allowing the client systems 204.1-204.2 to mount the volumes from one of the nodes 208.1-208.3 with a high level of flexibility.

Figure 3D:
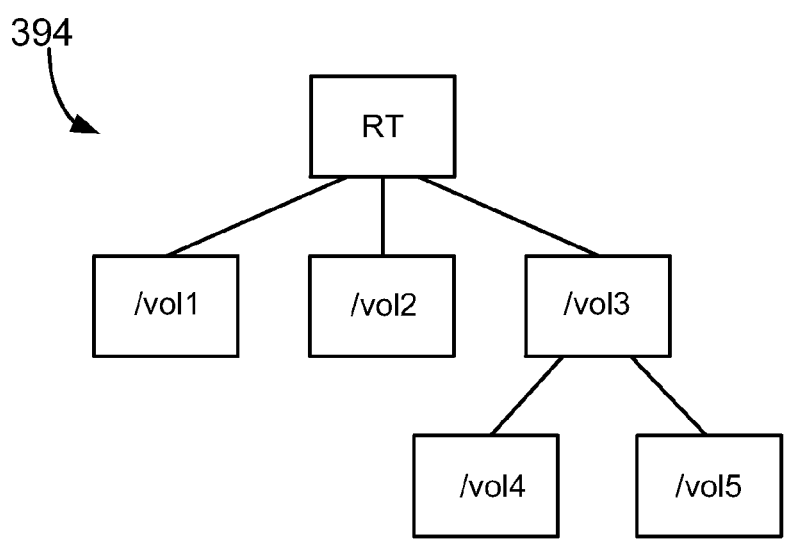
FIG. 3D shows an example of a namespace used according to one embodiment.

FIG. 3D depicts an exemplary global namespace 394 composed of the volumes RT, vol1, vol2, vol3, vol4, vol5. The global namespace 394 may be maintained by storage operating system and may be used in a cluster environment, for example, 200, FIG. 2. In the global namespace 394, each volume RT, vol1-vol5 represents a virtualized container storing a portion of the global namespace 394 descending from a single root directory. The volumes RT, vol1-vol5 are linked together in the global namespace 394 through a number of junctions. A junction is an internal mount point which, to a client, resolves to a directory (which would be the root directory of the target volume). Such a junction can appear anywhere in a volume, and can link a volume to the root directory of another volume. For example, in the clustered system 202, a junction in the volume vol3 associated with the D-module 216.2 links that volume to the root directory of the volume vol4, which is associated with the D-module 216.3. A junction can therefore link a volume on one of the D-modules 216.1-216.3 to another volume on a different one of the D-modules 216.1-216.3.

As shown in FIG. 3D, the global namespace 394 includes the volume RT (i.e., the root volume), which has three junctions linking the volume RT to the volumes vol1, vol2, vol3. The global namespace 394 further includes the volume vol3, which has two junctions linking the volume vol3 to the volumes vol4, vol5.

As shown in FIGS. 3C and 3D, data containers and the metadata associated with the data containers may be spread out among various volumes. In order to get information regarding data containers, storage usage and other user queries that rely on metadata information, one has to traverse the namespace and evaluate individual directory entries. Catalog module 119, as described below in detail efficiently organizes the metadata in a searchable data structure such that metadata can be easily searched and hence utilized to process user requests.

Figure 4A:
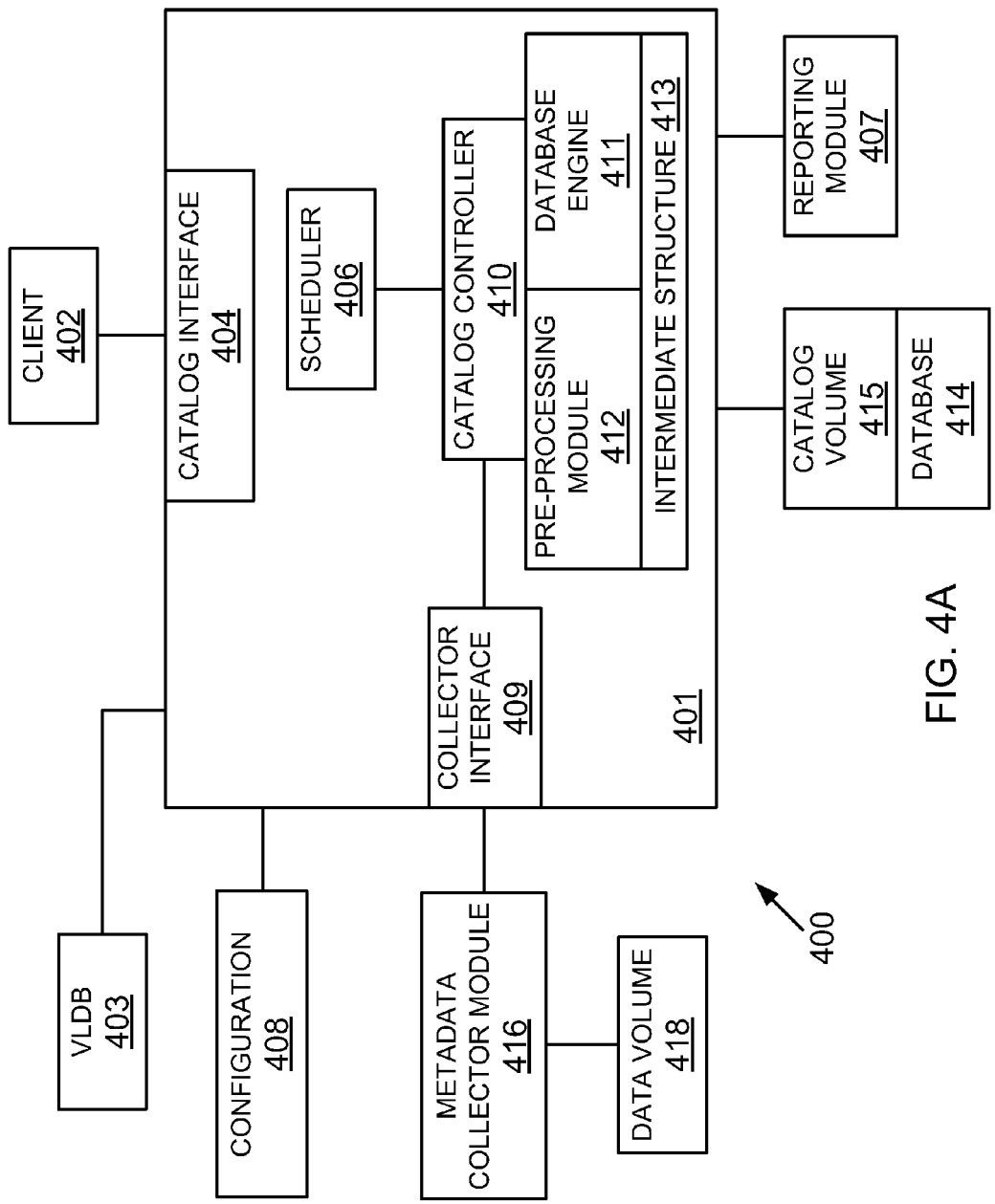
FIG. 4A shows an example of a catalog system, according to one embodiment.

Catalog System:

FIG. 4A shows an example of a catalog system 400 (may also be referred to as system 400) that collects metadata for a plurality of data containers, organizes the metadata (jointly referred to as "cataloging"), and then provides user requested information pertaining to the data containers, according to one embodiment. As described below, system 400 may include various modules some of which may be executed by the management console, the storage system as well as at the client level.

System 400 includes a catalog module 401 (similar to catalog module 119, FIG. 1B) that may be executed by or integrated with M-host 218 for a clustered environment 200 (FIG. 2) or operates as module (for example, 119, FIG. 1B) of management application 118 for storage environment 100 (FIG. 1A). Catalog module 401 includes a catalog controller module (also referred to as "catalog controller") 410 that interfaces with various modules and implements various cataloging related process steps, as described below.

Catalog controller 410 interfaces with a configuration module 408 that stores configuration information regarding cataloging metadata for a plurality of data containers at one or more data volumes. Configuration information may include information regarding how often metadata may be collected, frequency and manner for indexing the collected data as well as details regarding any actions/reports that a user may seek based on the collected metadata. Configuration module 408 may be a memory module that is accessible by catalog controller 410.

Catalog module 401 may also include a catalog scheduler 406 that interfaces with catalog controller 410 and schedules cataloging jobs. The cataloging jobs may include collecting metadata, arranging or indexing the collected metadata, generating reports based on collected and indexed metadata data, performing a search based on a user request, as well as taking an action based on the search results.

In one embodiment, catalog scheduler 406 receives a client request or may create a job request based on configuration information stored at configuration module 408. The job request may be for collecting metadata, arranging or indexing the collected metadata, generating reports based on the collected and indexed metadata data and performing a search based on a user request.

System 400 may further include metadata collection module 416 (may also be referred to as a metadata collector module), a pre-processing module 412 and a database engine 411. Metadata collection module 416 is used to collect metadata from operating system 300 for a plurality of data containers stored at a data volume, for example, 418. The structure and operation of metadata collection module 416 depends on the storage environment. For example, in one embodiment, in storage environment 100, an instance of metadata collection module 416 may be a part of storage system 108. In this example, metadata collection module 416 interfaces with the file system 302 and obtains metadata regarding a plurality of data containers stored in within volume 418.

In another embodiment, for storage environment 200, metadata collection module 416 may be executed at each node 208. In this example, metadata collection module 416 interfaces with each D-blade 216 to collect metadata for a plurality of data containers that may be stored within a volume accessible to each node 208.

The information collected by metadata collector 416 depends on user needs and how system 400 is configured. An example of the type of information that is collected is provided below.

In one embodiment, metadata is collected for an initial version of the plurality of data containers. This may be referred to as "baseline" metadata information (or baseline image). Storage environments typically maintain a snapshot of the file system and the associated data containers. A file system manager (302, FIG. 3A0 or any other module may take the actual snapshot and communicate it to catalog controller 410. The snapshots being a point in time copy of the file system may be used to restore a storage file system to an instance when the snapshot was taken.

A first snapshot for a data volume operates as a starting point and once that is created, metadata for data containers that may have changed after the first snapshot is collected and processed. One process that may be used to obtain differential information is called "SnapDiff" that is provided by NetApp Inc. the assignee of the present application. Metadata collection module 416 may use the SnapDiff process to first obtain baseline metadata information for the plurality of data containers that may be stored in data volume 418. Once the baseline is established, metadata collection module 416 may only collect information for data containers that may have been created, modified or deleted from the baseline snapshot. If there are no changes to data containers after the baseline image, then metadata for those data containers is not collected. It is noteworthy that system 400 may establish any snapshot to be a baseline and then collect incremental metadata for data containers that are modified or created after the baseline is established.

Metadata collection module 416 provides the collected metadata to catalog controller 410 via an interface 409 (similar to interface 301, FIG. 3A). The collected metadata is initially handled by pre-processing module 412 that receives the metadata and stores it in an intermediate data structure (may also be referred to as staging table or intermediate table) 413. Information from the intermediate table 413 is then used by database engine 411 for populating database 414 in a catalog volume 415. It is noteworthy that although pre-processing module 412 is shown as a separate module, it could be implemented as part of database engine 411.

The following provides an example of what information is collected, pre-processed and stored in intermediate table 413 and then stored in database 414 as a searchable data structure.

Metadata collection module 416 may collect the following information from file system 302:

(a) Unique data container identifier, for example, an inode number; (b) a data container type, i.e. if the data container is a directory, file and others; (c) information regarding whether the data container was accessed, created, modified or deleted; (d) a data container name (for example, NFS file name and CIFS file name) and path; (e) an owner identifier, for example, an NFS user identifier (UID) or a CIFS owner identifier; (f) a group identifier, for example, an NFS group identifier (GID); (g) a data container size; (h) permissions associated with the data container, for example, NFS permission bits that provide information regarding permissions associated with the data container; (i) time the data container was accessed (access time); (j) time the data container was modified (modification time); (k) time the data container was created (creation time), when applicable; and (l) any other user specified fields.

The pre-processing module 412 takes the foregoing information, extracts a plurality of fields and populates them in intermediate data structure 413. For example, pre-processing module 412, extracts the unique identifier value, the NFS and CIFS accessible path where the data container resides, data container name (i.e. NFS and CIFS accessible name), and extension of the data container that identifies a property of the container, for example, if a data container is a data file xyz.doc, then the pre-processing module extracts the ".doc".

The pre-processing module 412 also extracts information to identify the data container type, i.e. a file, directory or others, creation time of the data container, last time it was accessed and modified, if applicable. The pre-processing module 412 separates UID, GID, permission bits and the size of the data container.

In case the data container is a part of a directory and a snapshot, the pre-processing module 416 generates a unique identifier that identifies the snapshot. The pre-processing module 412 also generates a flag that identifies whether the data container was created, modified or deleted.

Once the intermediate table 413 is populated, database engine 411 takes that information and then either creates database 414, if one does not exist or modifies an exiting database 414. In one embodiment, database 414 may be a relational database that includes one or more components. Database 414 may include a plurality of searchable segments that are described below in detail. A user may request information regarding data containers and catalog module 401 provides user requested information using database 414.

A reporting module 407 is also provided such that user requested information may be compiled into reports. The layout and structure of the report will depend on the user needs and the user preferences. The user may set these reporting preferences using management application 118 via a user interface.

Figure 4B:
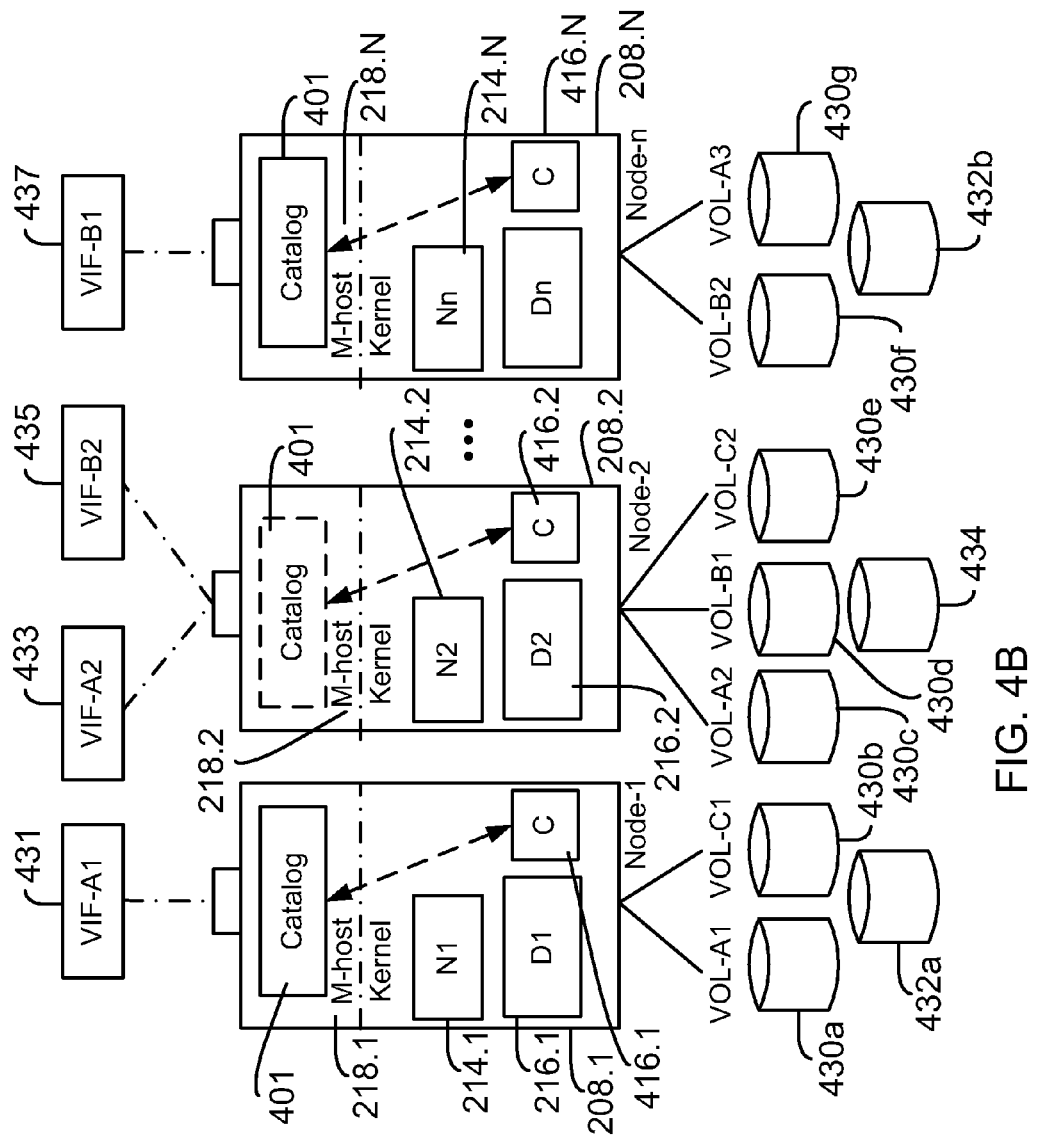
FIG. 4B shows an example of the catalog system used in a clustered storage environment, according to one embodiment.

Before describing the details of database 414, the following provides an example of using catalog system 400 in storage environment 429 (similar to 200) as shown in FIG. 4B, according to one embodiment. Each node in storage environment 429 may execute an instance of catalog module 401 that is described above with respect to FIG. 4A. Each node may also execute an instance of metadata collection module 416 (shown as C 416.1-416.n) to collect metadata from D-blades 216.1-216.n.

Storage environment 429 includes a plurality of volumes, namely 430a-430g. Volumes 430a and 430b are managed by D1 216.1, volumes 430c-430e are managed by D2 216.2 and volumes 430f and 430g are managed by Dn 216.n. The volumes in storage environment 429 may be provided to different virtual servers via VIFs 431, 433, 435 and 437. For example, VIF 431 provides access to volume 430d, VIF 433 provides access to volume 430c, VIF 435 provides access to volume 430d and VIF 437 provides access to volume 430f. Catalog module 401 manages metadata for the various vservers as if they were individual nodes.

Metadata collection module 416.1 collects metadata for volumes 430a and 430b. Catalog module 401 at node 208.1 then preprocesses the metadata and stores it at catalog volume 432a. Metadata collection module 416.2 collects metadata for volumes 430c-430e. The collected and pre-processed metadata is then stored at catalog volume 434. Similarly, metadata collection module 416.n collects metadata for volumes 430f and 430g which is then stored at catalog volumes 432b.

In one embodiment, a query involving metadata stored at different catalog volumes (for example, 432a, 432b and 434) may be generated. The catalog module at the node where the query is generated, gathers metadata from different catalog volumes and then the results are aggregated together and presented, as requested by the query. For example, when catalog module at node 208.2 receives a request for information regarding data containers stored at volumes 430a-430g, then catalog module 401 gathers information from catalog volumes 432a, 432b and 434 and presents the aggregated information to the user.

It is noteworthy that the systems disclosed herein, for example, 429 are scalable. Based on storage space utilization and overall performance, one can assign any volume to operate as a catalog volume. One can also add new catalog volumes to store metadata. Furthermore, a same volume may be configured to store data containers and metadata.

FIG. 4C shows an example of a data structure 440 (may also be referred to as snapshot table 440) having a plurality of columns that may be used by database engine 411 to index metadata for database tables 414. Snapshot table 440 may be a stand-alone table or integrated with database 414. Table 440 may also be stored on a per-volume basis on each catalog volumes, for example, 432a-b and 434, as shown in FIG. 4A.

Snapshot table 440 may include a plurality of fields' 440A-440F. Field 440A (ID) may be used to identify a snapshot itself. Field 440B (NAME) may be used to name the snapshot. Field 440C (Creation Time) may be used to store the time when the snapshot was taken. Field 440D (Index_Start_Time) stores a time when metadata collected for a particular snapshot was indexed. Field 440E (Index_End_Time) may be used to store a time when information for the snapshot was indexed.

The metadata for a particular snapshot may be indexed based on a schedule that may be established by a user during storage system configuration, a request generated by the user, initiated by a management application based on whether the overall storage system is busy doing other tasks or if the system is idle. The indexing itself can be optimized such that it does not negatively impact the overall performance of the storage environment.

Field 440F (ATTR) may be used to store attribute information regarding a snapshot. For example, field 440F may include a snapshot version indicator indicating a snapshot when a change in status for the data container was discovered.

Besides the fields shown in FIG. 4C, other fields may also be added. One such field may be referred to as a "tag". A tag is a user defined field that one can add, for example, a user may want to identify all files that are labeled as "confidential" by using a "confidential" tag. The systems and processes described herein allow one to search for metadata based on the tags.

Table 440 may be used to determine if there are any snapshots. The snapshots itself may be taken by the file system manager 302 (or any other module) and communicated to the catalog module via catalog interface 301 (See FIG. 3A). In one embodiment, whenever a snapshot is taken, file system manager 302 may send a notification to the catalog module.

When the first snapshot is taken, then metadata collected for that snapshot may be used as a baseline image for database table 414 (FIG. 4A), as described below. As more snapshots are taken, metadata for data containers that were created, modified or deleted from the initial snapshot is collected and indexed, as described below. If there is no change in the data containers after the initial snapshot, then no metadata is collected for the unchanged data containers.

FIGS. 4D and 4E show examples of data structures of database 414 generated by database engine 411 of catalog module 401, according to one embodiment. Database 414 may be a relational database having a plurality of searchable segments that logically interface with each other. For example, database 414 may include a directories table 450 and a data container table 452. The first searchable segment, a directory table 450, which may include information regarding all the directories for a data volume that is configured to be cataloged, for example, 418 (FIG. 4A). Directory table 450 may include a plurality of fields' 450A-450M that are now described below.

Field 450A (Identifier) may be a unique identifier to identify a directory, for example, an inode number, an inode generation number or both. Field 450B (Parent) identifies a "parent" for the directory. The parent in this case is an upper level directory to which the directory identified by 450A may belong. Field 450C provides a directory path.

Field 450D provides a name for the directory. Field 450E provides a directory size. Field 450F (Mode) provides the permissions associated with a directory. The permissions indicate what level of authority a user has with respect to a particular directory. Permissions may range from being able to read the directory entry to be able to create, modify or delete the entry and other permission types.

Field 450G identifies the owner of the directory, shown as "uid". Field 450H identifies a group to which the directory may belong to, shown as "Gid". In an enterprise having different business groups, for example, engineering, sales, marketing legal and others, a storage system may be divided among different entities. Field 450H identifies the group to which a particular directory belongs.

Field 450I (Atime) provides a time when the directory was last accessed, while field 450J (Ctime) provides a time when the directory was created. Field 450K (Mtime) includes a time when the directory was modified. Field 450L includes a flag that indicates whether an entry was added (by using a flag "A"), modified (by using a flag "M") or deleted (by using a flag "D").

Field 450M identifies a snapshot to which the directory may belong. This may be similar to field 440A shown in FIG. 4C.

Database 414 may also include a second searchable segment, for example, a data container table that may store metadata information regarding a plurality of data containers. FIG. 4E shows an example of data container table 452 that stores information regarding a plurality of data containers, for example, files. Each file in the data container table 452 is associated with an entry in the directories table 450. This allows one to include a path for a file only once in the directories table and one does not have to copy the path in data container table 452 every time the metadata for the file is indexed.

Data container table 452 may include various fields 452A-452L. Field 452A identifies the file with a unique identifier, for example, an inode number, an inode generation number or both. Field 452B associates a parent to the data container identified by field 452A. This field maps to an entry in the directory table 450. Because of this cross reference to the directory table, one does not have to enter the data container path for all individual data container entries. This saves memory space and processing time. For example, if there are one million files in a storage system, if one tried to save the paths for all one million files, it would take space and processing time. Instead, in one embodiment, field 452B cross references to a directory entry in data structure 450 where the path for each entry in data structure 452 is located.

In another embodiment, the structure of cross-referencing files to directory entry also reduces processing time when a directory is renamed. For example, if each file had an entry that provided the storage path and directory name, then one would have to go and change entries for each individual files. Using the foregoing scheme, one only has to update directory names and individual path entries do not need to be updated.

Field 452C includes a data container name, for example, a file name, while field 452D includes a size of the data container. Field 452E (Mode) identifies the permissions that may be associated with the data container. This includes, whether a user is permitted to simply read the data container content, modify it or delete it.

Field 452F (UID) identifies the owner of the data container, while field 452G (GID) identifies the group to which the data container belongs.

Field 452H (Atime) identifies the time the data container is accessed, field 452I (Ctime) identifies the time it was created, while field 452J (Mtime) identifies the time the data container was modified, if applicable. Field 452K is a flag that indicates whether the data container was created (A), modified (M) or deleted (D). Field 452L identifies the snapshot, if applicable to which the file belongs. This identifier is similar to 450M in table 450.

The following example explains the various entries of FIGS. 4D and 4E: Directories "a" and "b" are identified as 10 and 20 by identifier 405A in FIG. 4D. Directories "a" and "b" are parent directories as shown by directory path 450C entry "/". Directories "c" and " "d" are identified as 30 and 40 and are sub-directories under parent directory "a".

File f.txt as identified by file name 452C (FIG. 4E) is stored at "/a/c". The path can be obtained by using the cross referenced parent directory entry 30 under 452B (FIG. 4E). Files g.txt, h.doc, i.epp and j.pdf as identified by file name 452B are stored at "/a/d" as shown by the parent identifier 30. File e.jpeg is stored under sub-directory "b" based on parent identifier 20.

It is noteworthy that although FIGS. 4D and 4E show examples of different database tables 450 and 452, the adaptive embodiments are not limited to having separate tables. In one embodiment, the files and directory tables 450 and 452 may be included in a single table but differentiated by an identifier, for example, a Snapshot identifier.

FIG. 4F shows an example of populating directory and data container tables at time t0 and time t1. The directory table at time t0 identifies the inodes 10, 20, 30 and 40 under field 450A. The parent fields are specified as 0, 0, 10 and 10 under field 450B. The directory path is shown as /, /, /a/ and /a/ under field 450C. The names of the directories are provided as "a", "b", "c" and "d" under field 450D.

The files or data containers at time t0 are also shown in the data container table labeled as Files0. For example, field 452A provides the inode numbers 31, 41, 42, 43, 44 and 51 for files f.txt, g.txt, h.doc, i.cpp, j.pdf and e.jpeg, respectively. Each file is associated with a parent under field 452B, i.e. 30, 40, 40, 40, 40 and 20 respectively.

At time t1, another snapshot is taken and metadata for the snapshot at time t1 (may be referred to as Snap1) is shown as 450' and 452'. Under Snap1, directory z gets created under /b/ as indicated by the flag "A" which means added, directory c is moved from /a/c to /b/c and directory /a/d is modified.

In the Files1 table, at Snap1, file y.txt is created under /b/z, file j.pdf is modified and file h.doc is deleted.

In one embodiment, database segments 450 and 452 may be used efficiently to respond to user queries for information regarding data containers that can obtained by searching metadata information. Since metadata fields are organized in a relational database, one can search through the database to provide user requested information. The information type of course may vary based on a user request.

As shown above, database 414 is split into multiple logical tables 450 and 452. This is efficient and saves disk space because the data container tables (or file tables) do not include the path for every file entry and this saves storage space. Instead, each data container (for example, a file) is associated with a parent (or directory) identifier in a directories table. To access a data container, one simply has to look at the parent entry and ascertain the path where the data container is stored.

Figure 5A:
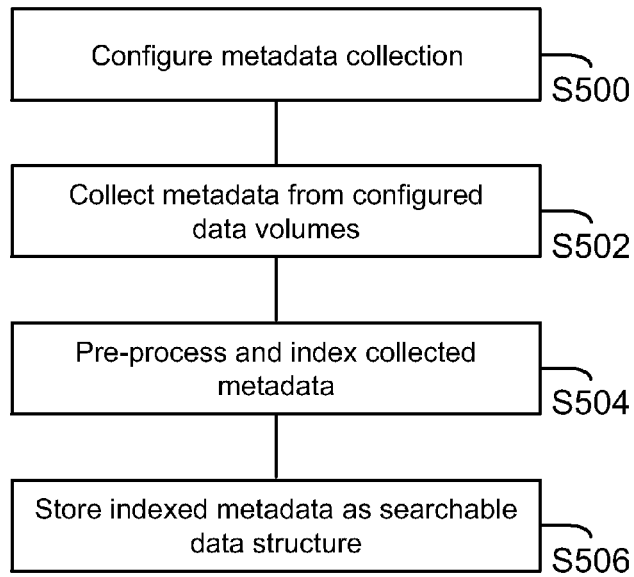
FIGS. 5A-5C show process flow diagrams, according to the various embodiments of the present disclosure.

Process Flow:

FIG. 5A shows a block diagram for using system 400 for collecting metadata, pre-processing and indexing the pre-processed metadata to build database 414, according to one embodiment. The process begins in block S500 when a storage volume is configured to operate as a catalog volume. A storage administrator having appropriate permissions and using management application 118 configures the storage volume as a catalog volume (for example, 415 (FIG. 4A) to store database 414.

The storage administrator may also configure one or more data volumes, for example, 418 (FIG. 4A) or 430a-430g (FIG. 4B) such that metadata for the data containers stored at the data volumes can be collected, indexed and then stored at the catalog volume. The storage administrator may associate one or more data volumes to a particular catalog volume. The storage administrator may specify a collection frequency which determines how often the metadata is collected. The storage administrator may also specify certain events based on which the metadata may be collected. For example, the storage administrator may specify that when a new snapshot is taken, metadata should be collected for the data containers that may have changed from a previous snapshot of the same data volume.

In block S502, metadata is collected by metadata collection module 416. In one embodiment, metadata is collected based on a user specified schedule as described above. In another instance, metadata may be collected based on an event, for example, a snapshot. In yet another embodiment, a user may send a request to collect metadata for a data volume.

The metadata that is collected by metadata collection module 416 may be for a baseline snapshot. This means that metadata is collected for all the data containers stored at the data volume. When there are changes to the data containers and a snapshot is taken at a later instance, then metadata is collected for only the changed data containers. Incremental metadata collection is efficient because one does not have to repeat the metadata collection step for all the data containers including data containers that may not have changed from a previous instance.

In one embodiment, for a clustered environment, the metadata collection module 416 is executed at one or more nodes and collects metadata associated with data volumes that are accessible to the node. The metadata may be collected from operating system 300 that maintains information regarding all the data containers at the selected data volume.

After the metadata is collected, it is pre-processed and placed at intermediate table 413 in block S504. One reason for pre-processing the metadata is because the metadata received from the operating system may be of a different format and one may have to extract one or more fields so that the information can be placed in database 414 and used efficiently to respond to user requests as described below. An example of how fields are extracted from the collected metadata and placed at intermediate table 413 has been described above.

After the metadata is pre-processed, the information from intermediate table 413 is indexed. The indexing is based on one or more fields that have been described above with respect to the database 414 tables.

The indexing in block S506 may be based on a policy that is set up by a user and stored in configuration module 408 (FIG. 4A). The policy allows a user to set indexing of metadata collected after each snapshot. The indexing may be "on-demand" i.e. based on when a user or storage administrator sends a request to start indexing. In another embodiment, indexing may be time based such that catalog controller 410 starts indexing based on a set schedule. The indexing policy settings make the system and process flexible because users in different storage environments may use different polices for indexing metadata based on user needs.

After the pre-processed metadata is indexed, in block 506, it is stored in database 414. In one embodiment, the stored metadata is placed in a searchable relational database 414. An example, of searchable database 414 is described above with respect to FIGS. 4C-4F.

In one embodiment, for a clustered environment, database 414 may be stored at one or more volumes that may be referred to as catalog volumes. Metadata collected from different nodes may be stored at the catalog volumes. Catalog controller 410 can access a volume locator database (VLDB) 403 (FIG. 4A) (or 220, FIG. 2A) that identifies different volumes and their locations. This allows the catalog controller to cross reference the volume identifiers with the collected metadata.

Figure 5B:
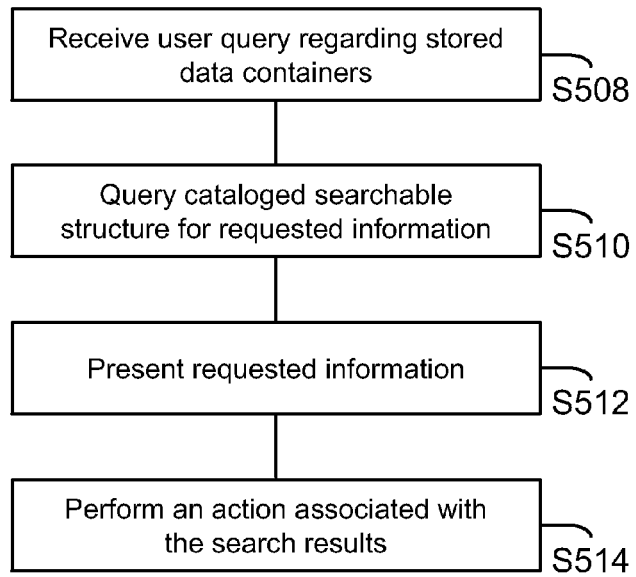

FIG. 5B shows a process flow diagram for handling query requests using database 414, according to one embodiment. The process begins in block S508 when a user request is received by catalog module 401. The user request may be received via a user interface that is provided by client 402 (FIG. 4A). The request is received by catalog interface 404 and forwarded to scheduler 406. Scheduler 406 may maintain one or more queues for receiving user requests. The user request is then forwarded to catalog controller 410. In another embodiment, the query may be scheduled by the user based on a specified duration or an event, as described above.

In block S510, the query is forwarded to database engine 411 so that user requested information can be obtained from database 414. Catalog controller 410 parses the user request to ascertain what fields in database 414 may need to be searched. For example, if the user wants to know how many ".pdf" files belong to a particular group, then catalog controller will search file name 452C and group identifier 452G to respond to the query.

In block S512, the user requested information is presented to the user. The information may be displayed in a user interface on a display device. The information may be presented as a report by reporting module 407.

In block S514, an action that may need to be taken, based on the search results is performed. The nature and action type may be based on user request. For example, a user request may be to obtain information regarding certain file types for example, video files. The action associated with the file type may be to move the certain file type from one volume to another volume. Catalog controller 410 obtains the file types by searching database 414 that stores information regarding file types. Thereafter, catalog controller communicates with operating system 300 to move the files from the first location to one or more locations. This example is provided to illustrate the adaptive nature of the various embodiments and not to limit the various embodiments shown herein.

Figure 5C:
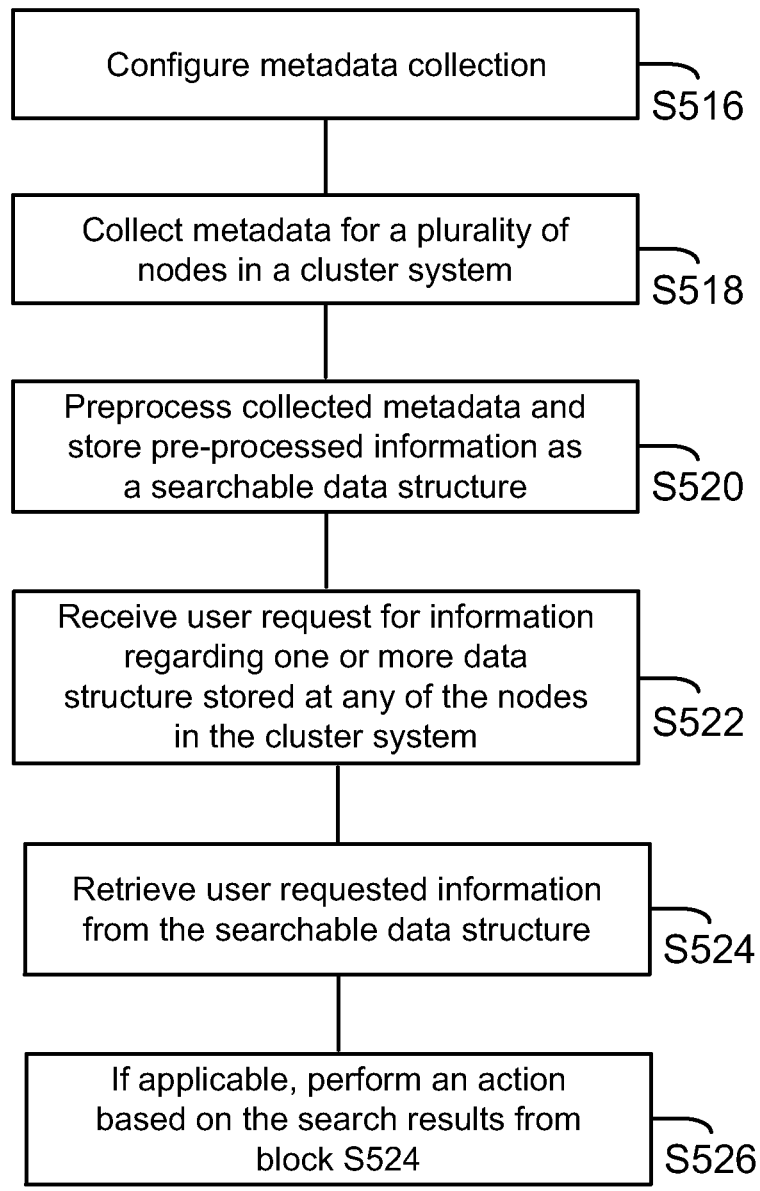

FIG. 5C shows a process flow diagram for collecting metadata and then processing user requests in a clustered system, according to one embodiment. The process begins in block S516 when a storage volume is configured for collecting metadata. Referring back to FIG. 4C, the different volumes 430a-430g associated with different virtual servers may be configured to collect metadata.

In block S518, metadata is collected from a plurality of nodes. The metadata is collected by metadata collection module 416 executed by the plurality of nodes and then stored at one or more catalog volumes (432a, 432b and 434, FIG. 4B).

An example, of this is shown in FIG. 4B, where metadata collection modules 416.1-416.N are executed at each node and collect metadata for data volumes that are configured in block S516.

In block S520, metadata collected from different volumes and controlled by different nodes is pre-processed and stored in database 414 at catalog volume 434 (FIG. 4B). The pre-processing is performed so that information from the collected metadata can be used to populate database 414. The collected metadata may arrive in an order determined by the storage operating system. The collected metadata may include more information than what may be needed by catalog module 401. The pre-processing is performed such that catalog module can extract the relevant fields and values that are used in database 414. Details regarding pre-processing and database 414 are provided above with respect to FIGS. 4A-4F and FIGS. 5A-5B.

In block S522, a user query for information regarding a plurality of data structures that may be stored at different volumes and controlled by different nodes is received. The user query is received by catalog module 410 via a user interface provided by management application 118. A user may request different information types for the plurality of data structures. The type of user query and the nature of information that the user may seek depends on how a user is using storage environment 200.

In block S524, database 414 is used to search for information requested by the user. Searching database 414 is faster and less taxing on computing resources vis-à-vis performing a directory "walk" analyzing metadata for millions of files. For example, to determine how many files were accessed within certain duration, one only has to search using field 452G and ascertain the number of files within the specified duration. One is able to do that because of the way database 414 is structured and built.

In some instances, an action may be associated with a search query. When an action is associated with a search query, then the requested action associated with the search results is performed in block S526. For example, a user may configure a volume such that after every snapshot, certain file types may be moved to another location. To accommodate this action, after every snapshot, first database 414 is searched to ascertain the file types and then operating system 300 is notified to move the file types.

In one embodiment, using catalog system 400 and the process steps described above, one can efficiently search metadata for data containers stored at one or more data volumes both in a clustered environment 200 and non-cluster environment 100. In traditional storage environments, the operating system is typically geared towards handling access to one object at a time. Access to a group of files within a file system is difficult. Furthermore, the operating system layout is such that metadata for a data container, for example, a file name, attributes, access control lists, information regarding the owner may not be stored contiguously at the storage devices. Therefore, to access information regarding a data container or a group of data containers, one has to traverse through a namespace and perform a directory search.

The embodiments disclosed herein efficiently search for data containers using relational database 414 and its associated tables. For example, one can search for "all files greater than size 1 MB that were not accessed within the last year" by searching data structure 452. One can use the size field 452D and access time field 452H to filter all files that may be greater than 1 MB and were not accessed within one year, without having to do an extensive namespace based directory search.

In one embodiment, catalog system 400 integrates metadata management related operations as well as data container related operations within a storage environment. In conventional systems, typically, one vendor provides an operating system 300 and a different vendor provides a separate system for handling metadata related operations. Catalog system 400 is integrated with operating system 300 and management application 118. Hence, one does not need to use another third party module for handling metadata related operations.

In one embodiment, metadata related operations are executed efficiently because catalog system 400 is integrated with operating system 300. This allows one to use operating system 300's ability to collect metadata efficiently. If one were to use an external, third party system, then one will have to scan an entire file system using other techniques, compared to the techniques that are integrated with the operating system.

In one embodiment, because metadata is handled efficiently, one can provide useful reports to users such that users can efficiently use the storage space. The reports are provided by reporting module 407 and management application 118 via a user interface. The data for the reports is provided by catalog module 401 and formatted and presented by management application 118.

Reports can be configured based on user specified parameters, for example, users may want to know what different types of files are being used, for example, media files, ".doc" files and others. In conventional systems, to gather that information, one will have to traverse through a namespace/directory that may include millions of files. In the embodiments disclosed herein, one can obtain this information from database 414 by searching field 452C that includes the file type. This is faster and more efficient than searching through a directory that may include millions of files.

The embodiments herein also allow a user to generate reports based on different users that use the storage space. For example, by searching database 414 using fields 452C and owner identification field 452F, one can ascertain which users are using a certain file type. One can also view usage of storage space based on groups, by using the group identifier 452G. One can do this efficiently because of the manner in which the relational database 414 is structured.

In another embodiment, reports can be generated based on volumes that are spread out in a clustered environment 200. Because metadata is collected for different nodes and efficiently cataloged at one or more catalog volumes (for example, 434, FIG. 4B), one is able to obtain an overall view of the clustered system, as well as node based view. A storage administrator can issue cluster wide requests and catalog module can obtain information regarding the entire cluster or for specific volumes. One can obtain all this information without having to perform an entire file system search that can be resource intensive and inefficient.

In yet another embodiment, not only one can generate reports and perform fast queries, one can also perform actions that may be related to the search results. For example, a user may want to know how many files of a certain type, for example, .mp3, are saved in the storage system and then move the files to a different storage environment. One can conduct an efficient search using database 414 and then perform the appropriate action. This allows a user to efficiently use storage space. Continuing with the foregoing example, if the .mp3 files are not being accessed or used frequently and the user has access to secondary storage that is also not used frequently, then the user can move the files to the secondary storage that is used infrequently.

This allows a user to efficiently manage and use storage resources. The user can obtain storage system usage views efficiently by using database 414 and based on user needs perform the appropriate actions for moving information around.

The embodiments disclosed herein allow a user to search for data containers based on a data container owner, name of the data container, modification time, access time and type of data container and other fields. The search may be performed by combining different fields. For example, a user can search which owners and groups use the highest amount of storage as well as the least amount of storage. One can then apportion storage cost to individuals, teams and business units.

Since metadata is collected incrementally for different snapshots, one can look at the growth of storage between snapshots. This will allow storage administrators to plan better for upgrading or downgrading storage space, based on business need.

It is noteworthy that the systems and processes described herein are not limited to collecting metadata for Snapshots but instead catalog module may catalog metadata for an active file system.

Storage System Node:

FIG. 6 is a block diagram of a node 208.1 (FIG. 2) that is illustratively embodied as a storage system comprising of a plurality of processors 602A and 602B, a memory 604, a network adapter 610, a cluster access adapter 612, a storage adapter 616 and local storage 613 interconnected by a system bus 608. The local storage 613 comprises one or more storage devices, such as disks, utilized by the node to locally store configuration information (e.g., in a configuration table 614).

The cluster access adapter 612 comprises a plurality of ports adapted to couple node 208.1 to other nodes of cluster 202. In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 612 is utilized by the N/D-module for communicating with other N/D-modules in the cluster 202.

Each node 208.1 is illustratively embodied as a dual processor storage system executing a storage operating system 606 that preferably implements a high-level module, such as a file system, to logically organize the information as a hierarchical structure of named directories, files and special types of files called virtual disks (hereinafter generally "blocks") on disks 212.1. However, it will be apparent to those of ordinary skill in the art that the node 208.1 may alternatively comprise a single or more than two processor systems. Illustratively, one processor 602A executes the functions of the N-module 214.1 on the node, while the other processor 602B executes the functions of the D-module 216.1.

The memory 604 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 300, portions of which is typically resident in memory and executed by the processing elements, functionally organizes the node 208.1 by, inter alia, invoking storage operations in support of the storage service implemented by the node. An example of operating system 300 is the DATA ONTAP® (Registered trademark of NetApp, Inc.) operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 610 comprises a plurality of ports adapted to couple the node 208.1 to one or more clients 204.1/204.2 over point-to-point links, wide area networks, virtual private networks implemented over a public network (Internet) or a shared local area network. The network adapter 610 thus may comprise the mechanical, electrical and signaling circuitry needed to connect the node to the network. Illustratively, the computer network 106 may be embodied as an Ethernet network or a Fibre Channel (FC) network. Each client 204.1/204.2 may communicate with the node over network 106 by exchanging discrete frames or packets of data according to pre-defined protocols, such as TCP/IP.

The storage adapter 616 cooperates with the storage operating system 300 executing on the node 208.1 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on disks 212.1. The storage adapter 616 comprises a plurality of ports having input/output (I/O) interface circuitry that couples to the disks over an I/O interconnect arrangement, such as a conventional high-performance, FC link topology.

Storage of information on each array 212.1 is preferably implemented as one or more storage volumes that comprise a collection of physical storage disks 212.1 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a RAID. Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Figure 7:
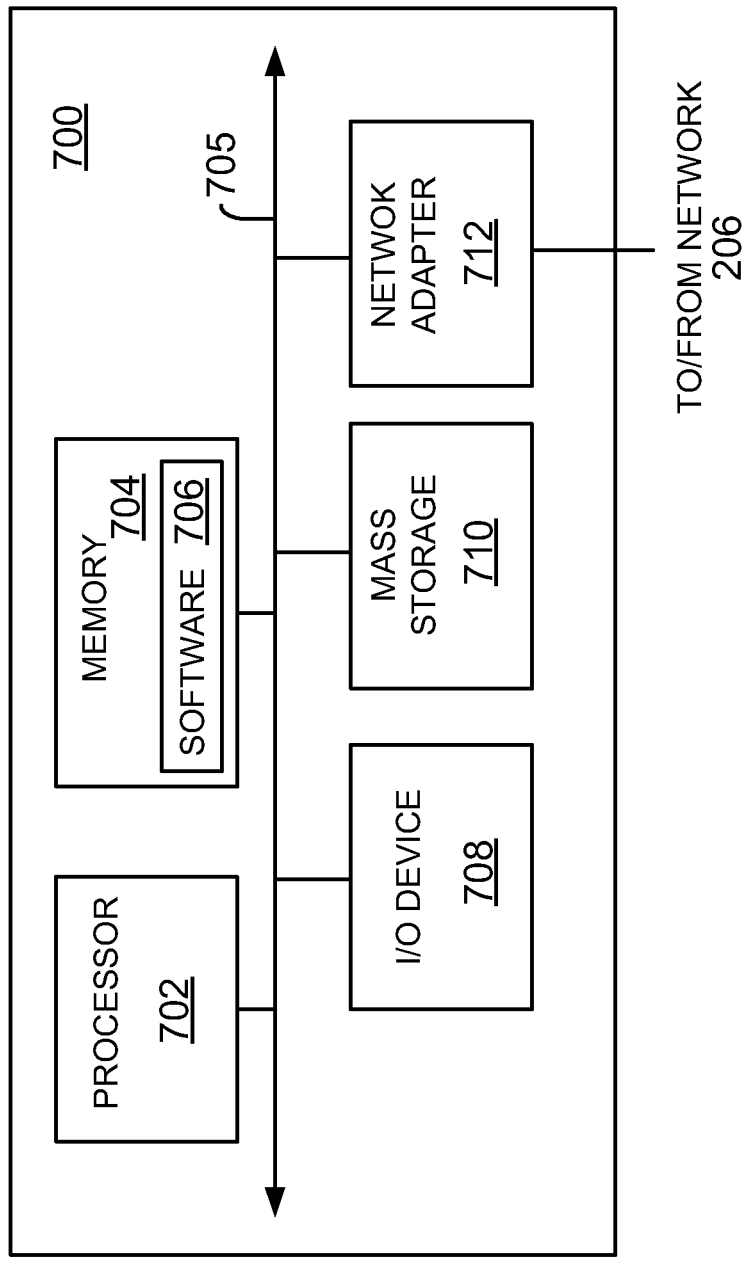
FIG. 7 shows an example of a computing system for implementing the process steps of the present disclosure.

Processing System:

FIG. 7 is a high-level block diagram showing an example of the architecture of a processing system, at a high level, in which the executable instructions described above can be implemented. The processing system 700 can represent management console 120, for example. Note that certain standard and well-known components which are not germane to the present invention are not shown in FIG. 7.

The processing system 700 includes one or more processors 702 and memory 704, coupled to a bus system 705. The bus system 705 shown in FIG. 7 is an abstraction that represents any one or more separate physical buses and/or point-to-point connections, connected by appropriate bridges, adapters and/or controllers. The bus system 705, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 702 are the central processing units (CPUs) of the processing system 700 and, thus, control its overall operation. In certain embodiments, the processors 702 accomplish this by executing executable instructions 706 stored in memory 704. A processor 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 704 represents any form of random access memory (RAM), read-only memory (ROM), flash memory, or the like, or a combination of such devices. Memory 704 includes the main memory of the processing system 700. Instructions 706 may be used to implement the techniques introduced above (e.g. catalog module 401) may reside in and executed (by processors 702) from memory 704.

Also connected to the processors 702 through the bus system 705 are one or more internal mass storage devices 710, and a network adapter 712. Internal mass storage devices 710 may be or may include any conventional medium for storing large volumes of data in a non-volatile manner, such as one or more magnetic or optical based disks. The network adapter 712 provides the processing system 700 with the ability to communicate with remote devices (e.g., storage servers 202) over a network and may be, for example, an Ethernet adapter, a Fibre Channel adapter, or the like. The processing system 700 also includes one or more input/output (I/O) devices 708 coupled to the bus system 705. The I/O devices 708 may include, for example, a display device, a keyboard, a mouse, etc.

Thus, a method and apparatus for managing metadata for data containers have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A system, comprising:
a plurality of computing nodes having a processor and a network interface such that the nodes are operationally coupled to each other, each node processor executing instructions for managing at least a storage volume from among a plurality of storage volumes used for storing a plurality of data containers;

a processor executable metadata collection module executed by the plurality of computing nodes for collecting metadata associated with the plurality of data containers, the metadata including an attribute that is associated with the plurality of data containers; and a processor executable catalog module executed by the plurality of computing nodes for pre-processing the collected metadata by extracting one or more fields and storing the pre-processed metadata in a searchable data structure for responding to a user query requesting information regarding any data container stored at any storage volume and managed by any node;

wherein the searchable data structure includes a first searchable segment for storing metadata for a plurality of directory entries and a second searchable segment for storing metadata for non-directory based data containers; and wherein each entry in the second searchable segment stores a reference to a parent entry in the first searchable segment such that a storage path of each entry in the second searchable segment can be obtained from the reference to the parent entry in the first searchable segment without having to store individual storage paths for the non-directory based data containers at the second searchable segment.

2. The system of claim 1, wherein the pre-processed metadata associated with the plurality of data containers is indexed by the catalog module before being stored in the searchable data structure.

3. The system of claim 1, wherein the searchable data structure is stored at a dedicated storage volume configured to operate as a catalog volume for responding to a user query for information regarding any data container stored at any storage volume.

4. The system of claim 1, wherein the pro-processed metadata associated with the plurality of data containers is stored in a distributed structure at different storage volumes.

5. The system of claim 4, wherein the user query for information regarding any data container is received by the catalog module executed by one of the nodes and the catalog module collects the information based on the user query from one or more nodes, aggregates the information and responds to the user query.

6. The system of claim 4, wherein the metadata collection module interfaces with a file system for a storage system to collect the metadata.

7. The system of claim 1, wherein the user query is received by any of the plurality of nodes.

8. The system of claim 1, wherein the pre-processed metadata is stored in an intermediate data structure prior to being stored in the searchable data structure.

9. The system of claim 1, wherein the catalog module receives metadata from the metadata collector.

10. The system of claim 1, wherein the metadata for the plurality of directories includes a directory path indicating where a directory entry is stored.

11. The system of claim 10, wherein the searchable data structure stores attributes for the plurality of directories including a unique directory identifier and a directory name.

12. The system of claim 10, wherein the searchable data structure stores attributes for the plurality of directories including a size of a directory and permissions associated with a directory.

13. The system of claim 10, wherein the searchable data structure stores attributes for the plurality of directories including a user identifier for identifying a user that uses a directory and a group identifier identifying a group to which a directory may belong.

14. The system of claim 10, wherein the searchable data structure stores attributes for the plurality of directories including an access time when a directory was accessed, a creation time when a directory was created and a modification time when a directory was modified.

15. The system of claim 10, wherein the searchable data structure stores attributes for a plurality of directories including an indicator indicating if a directory was created, modified or deleted.

16. The system of claim 10, wherein the searchable data structure stores attributes for the plurality of directories including a unique directory identifier, a directory path, a directory name, a size of a directory, a permission associated with a directory, a user identifier that uses a directory, a group identifier identifying a group associated with a directory, an access time when a directory was accessed, a creation time when a directory was created, a modification time when a directory was modified and an indicator indicating if a directory was created, modified or deleted.

17. The system of claim 1, wherein the searchable data structure stores attributes for the plurality of data containers, including a unique identifier for identifying a data container and an identifier that associates a data container to a directory entry.

18. The system of claim 1, wherein the searchable data structure stores attributes for the plurality of data containers, including a data container name, a size of a data container and permissions associated with a data container.

19. The system of claim 1, wherein the searchable data structure stores attributes for the plurality of data containers, including a user identifier for identifying a user associated with a data container and a group identifier for identifying a group associated with the data container, based on which a user based and a group based report regarding the plurality of data containers is generated.

20. The system of claim 1, wherein the searchable data structure stores attributes for the plurality of data containers, including an access time when a data container was accessed.

21. The system of claim 1, wherein the searchable data structure stores attributes for the plurality of data containers, including a creation time when a data container was created and a modification time when a data container was modified.

22. The system of claim 1, wherein the searchable data structure stores attributes for the plurality of data containers, including an indicator that indicates if a data container was created, modified or deleted at any given time.

23. The system of claim 1, wherein the searchable data structure stores custom attributes that are associated with the plurality of data containers and defined by a user.

24. The system of claim 1, wherein the searchable data structure stores attributes for the plurality of data containers, including a unique identifier for identifying a data container, an identifier that associates a data container to a directory entry, a data container name, a size of a data container, a permission associated with a data container, a user identifier identifying a user for a data container, a group identifier identifying a group associated with the data container, an access time when a data container was accessed, a creation time when a data container was created, a modification time when a data container was modified and an indicator indicating if a data container was created, modified or deleted.

25. A system, comprising:
a processor executable catalog module executed by a plurality of computing nodes having a processor and a network interface such that each node is operationally coupled to each other, each node processor executing instructions for managing at least a storage volume from among a plurality of data storage volumes used for storing a plurality of data containers, the catalog module configured to pre-process collected metadata by extracting one or more fields, the metadata including an attribute that is associated with the plurality of data containers, and then generating a searchable data structure based on the pre-processed metadata for obtaining information regarding any data container stored at any storage data volume and managed by any node; wherein the searchable data structure includes a first searchable segment for storing metadata for a plurality of directory entries and a second searchable segment for storing metadata for non-directory based data containers; and wherein each entry in the second searchable segment stores a reference to a parent entry in the first searchable segment such that a storage path of each entry in the second searchable segment can be obtained from the reference to the parent entry in the first searchable segment, without having to store individual storage paths for the non-directory based data containers at the second searchable segment.

26. The system of claim 25, wherein the searchable data structure is stored at a storage volume configured to operate as a catalog volume for responding to a user query for information regarding any data container stored at any storage volume.

27. The system of claim 25, wherein the searchable data structure stores attributes for a plurality of directories including a unique directory identifier, a directory path, a directory name, a size of a directory, a permission associated with a directory, a user identifier for identifying a user that uses a directory, a group identifier identifying a group associated with a directory, an access time when a directory was accessed, a creation time when a directory was created, a modification time when a directory was modified and an indicator indicating if a directory was created, modified or deleted.

28. The system of claim 25, wherein the searchable data structure stores attributes for the plurality of data containers, including a unique identifier for identifying a data container, an identifier that associates a data container to a directory entry, a data container name, a size of a data container, a permission associated with a data container, a user identifier identifying a user for a data container, a group identifier identifying a group associated with the data container, an access time when a data container was accessed, a creation time when a data container was created, a modification time when a data container was modified and an indicator indicating if a data container was created, modified or deleted.

29. A system, comprising:
a computing system having a processor for generating a request for information regarding a plurality of data containers stored at a plurality of storage volumes;
a plurality of computing nodes each having a node processor and a network interface for interfacing with each other and the computing system and each node processor executing code for managing the plurality of storage volumes; and
a processor executable catalog module executed by the plurality of nodes, the catalog module configured to (i) pre-process collected metadata by extracting one or more fields, the metadata including an attribute that is associated with the plurality of data containers and (ii) for generating a searchable data structure using the pre-processed metadata for responding to the request for information regarding any data container stored at any storage data volume and managed by any of the plurality of nodes; wherein the searchable data structure includes a first searchable segment for storing metadata for a plurality of directory entries and a second searchable segment for storing metadata for non-directory based data containers; and wherein each entry in the second searchable segment stores a reference to a parent entry in the first searchable segment such that a storage path of each entry in the second searchable segment can be obtained from the reference to the parent entry in the first searchable segment, without having to store individual storage paths for the non-directory based data containers at the second searchable segment.

30. The system of claim 29, wherein the searchable data structure stores attributes for a plurality of directories including a unique directory identifier, a directory path, a directory name, a size of a directory, a permission associated with a directory, a user identifier for identifying a user that uses a directory, a group identifier identifying a group associated with a directory, an access time when a directory was accessed, a creation time when a directory was created, a modification time when a directory was modified and an indicator indicating if a directory was created, modified or deleted.

31. The system of claim 29, wherein the searchable data structure stores attributes for the plurality of data containers, including a unique identifier for identifying a data container, an identifier that associates a data container to a directory entry, a data container name, a size of a data container, a permission associated with a data container, a user identifier identifying a user for a data container, a group identifier identifying a group associated with the data container, an access time when a data container was accessed, a creation time when a data container was created, a modification time when a data container was modified and an indicator indicating if a data container was created, modified or deleted.

* * * * *